(12) United States Patent
Nakabayashi

(10) Patent No.: US 11,633,760 B2
(45) Date of Patent: Apr. 25, 2023

(54) MULTILAYER COATING FILM FORMATION METHOD

(71) Applicant: KANSAI PAINT CO., LTD., Hyogo (JP)

(72) Inventor: Takuya Nakabayashi, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 45 days.

(21) Appl. No.: 16/611,974

(22) PCT Filed: May 10, 2018

(86) PCT No.: PCT/JP2018/018211
§ 371 (c)(1),
(2) Date: Nov. 8, 2019

(87) PCT Pub. No.: WO2018/207893
PCT Pub. Date: Nov. 15, 2018

(65) Prior Publication Data
US 2021/0129186 A1 May 6, 2021

(30) Foreign Application Priority Data
May 11, 2017 (JP) .............................. JP2017-094843

(51) Int. Cl.
| | | |
|---|---|---|
| *B05D 7/00* | (2006.01) | |
| *B05D 7/14* | (2006.01) | |
| *C08F 220/18* | (2006.01) | |
| *C08F 220/32* | (2006.01) | |
| *C08F 212/08* | (2006.01) | |
| *C08F 222/06* | (2006.01) | |
| *C08K 5/17* | (2006.01) | |
| *C08K 5/375* | (2006.01) | |
| *C08L 67/02* | (2006.01) | |

(52) U.S. Cl.
CPC ............ *B05D 7/5723* (2013.01); *B05D 7/14* (2013.01); *C08F 212/08* (2013.01); *C08F 220/1804* (2020.02); *C08F 220/1806* (2020.02); *C08F 220/325* (2020.02); *C08F 222/06* (2013.01); *C08K 5/17* (2013.01); *C08K 5/375* (2013.01); *C08L 67/02* (2013.01); *B05D 2202/10* (2013.01); *B05D 2320/00* (2013.01); *B05D 2401/20* (2013.01); *B05D 2425/01* (2013.01); *B05D 2425/02* (2013.01); *B05D 2425/03* (2013.01); *B05D 2502/005* (2013.01); *B05D 2508/00* (2013.01)

(58) Field of Classification Search
CPC .... B05D 7/5723; B05D 7/14; B05D 2202/10; B05D 2320/00; B05D 2401/20
See application file for complete search history.

(56) References Cited

U.S. PATENT DOCUMENTS

| | | | |
|---|---|---|---|
| 5,719,212 A | 2/1998 | Nakae et al. | |
| 2007/0148356 A1* | 6/2007 | Russell | C09D 5/008 427/430.1 |
| 2011/0293844 A1* | 12/2011 | Kasai | C09D 169/00 427/407.1 |
| 2015/0284585 A1* | 10/2015 | Onishi | C08F 220/1802 427/386 |

FOREIGN PATENT DOCUMENTS

| | | |
|---|---|---|
| EP | 0 789 064 | 8/1997 |
| JP | 09-104803 | 4/1997 |
| JP | 09-188833 | 7/1997 |
| JP | 2003-041185 | 2/2003 |
| JP | 2003-313490 | 11/2003 |
| JP | 2003313490 A * | 11/2003 |
| JP | 2004-73956 | 3/2004 |
| JP | 2004-346294 | 12/2004 |
| JP | 2004346294 A * | 12/2004 |
| JP | 2010-504374 | 2/2010 |
| JP | 2010-100738 | 5/2010 |
| JP | 2010-150099 | 7/2010 |
| JP | 2011-020085 | 2/2011 |
| JP | 2012-1660 | 1/2012 |
| WO | 2008/035622 | 3/2008 |

OTHER PUBLICATIONS

Extended European Search Report dated Jan. 14, 2021 in corresponding European Patent Application No. 18799343.1.
International Search Report dated Aug. 7, 2018 in International (PCT) Application No. PCT/JP2018/018211.

(Continued)

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

The multilayer coating film formation method for forming a multilayer coating film on a substrate comprises the steps of: applying an undercoat paint composition (X) comprising an antioxidant (a1) to a substrate to form at least one layer of an uncured first coating film; applying a topcoat paint composition (Y) containing a carboxy-containing polymer (b1) and an epoxy-containing acrylic resin (b2) to the first coating film to form an uncured second coating film; and simultaneously heating the uncured first coating film and the uncured second coating film to cure the films.

23 Claims, No Drawings

(56) References Cited

OTHER PUBLICATIONS

Office Action dated Aug. 27, 2021, in corresponding Chinese Patent Application No. 201880030833.9, with English translation.
Ou et al., "Quick Reference Manual for the Performance and Selection of Plastic Additives", 2012, pp. 11-22 (Ref. CA providing sufficient concise description of relevance).
Zhao Zhenhe, "Polymer Chemistry and Physics", pp. 181-183, China Textile Press, Sep. 2003.
Zhao Zhifeng et al., "Material Chemistry", p. 85, Harbin University of Technology Press, Aug. 2012.
"Synthesis and Application of Fine Chemical Products", pp. 131-133, Dalian University of Technology Press, Aug. 2002.

\* cited by examiner

MULTILAYER COATING FILM FORMATION METHOD

TECHNICAL FIELD

The present invention relates to a method for forming a multilayer coating film.

BACKGROUND ART

In the past, acrylic melamine organic solvent-based paints have been widely used on the outer panel surface of vehicle bodies. However, these low-solids paints contain a large amount of organic solvent. Paints called high-solids paints, which have a solvent content of not more than 50% by mass, have been increasingly used as environment-friendly paints.

Among these, as topcoats for vehicles, there have been proposed various crosslinked paints that have an ester bond formed by a reaction between an epoxy group and an acid group, such as a carboxy group. However, as compared with conventional melamine-based paints, such acid-epoxy curable paints have a problem in that significant yellowing occurs in the clear coating film when it is cured by heating.

Patent Literature (PTL) 1 discloses a low-solvent paint comprising at least a polymer having two or more epoxy groups, on average, per molecule (a); a curing agent (b); and an organic solvent (c), the curing agent (b) being an aliphatic tricarboxylic acid. The low-solvent paint disclosed in PTL 1 may contain an antioxidant. PTL 1 discloses that the use of Irganox 1010 as an antioxidant can significantly improve yellowing of the coating film that would occur after baking (paragraph [0063]; and Table 10 in paragraph [0076]).

Patent Literature 2 (PTL 2) discloses a high-solids-content curable resin composition comprising
(a) 10 to 70 wt. % of an acrylic polycarboxylic acid having 2 or more carboxy groups, on average, per molecule, an acid value of 5 to 300 mg KOH/g solids, and a number average molecular weight of 500 to 8,000;
(b) 10 to 80 wt. % of a polyepoxide having an epoxy equivalent of 50 to 700, and a number average molecular weight of 200 to 10000; and
(c) 0.1 to 10 wt. % of an antioxidant.
The antioxidant (c) is one, or two or more antioxidants selected from phenolic antioxidants, phosphite antioxidants, and thioether antioxidants, PTL 2 discloses that when several antioxidants, such as Sumilizer BHT, are used, the color difference between the coating film of the clear paint and a white plate is reduced (Table 3 in paragraph [0168]; and Table 4 in paragraph [0169]).

CITATION LIST

Patent Literature

PTL 1: JP2004-346294A
PTL 2: JPH9-104803A

SUMMARY OF INVENTION

Technical Problem

PTL 1 discloses improvement in yellowing of a coating film of a low-solvent-content paint that occurs during bake-curing. However, when the cured coating film was left outdoors for several days, the color of the coating film was subject to change. In this case, since the color of the coating film cannot be inspected until color change of the coating film subsides, there is a long period of time from baking of the coating film until shipment, and the production line efficiency is problematically reduced.

PTL 2 discloses the measurement of color difference between a clear paint composition bake-curing that is bake-cured, and a white plate. However, PTL 2 nowhere discloses the color change of a cured coating film after being left outdoors for several days.

If there is a coating film that is less susceptible to color change even when left outdoors for several days after bake-curing, shipment can be made within a short period of time after bake-curing the coating film, becoming advantageous in terms of improving the production line efficiency.

An object of the present invention is to provide a method for forming a multilayer coating film that has excellent acid resistance, smoothness, and gloss; and whose color change over time after being left outdoors is significantly suppressed.

Solution to Problem

The present inventors found that the above object can be achieved by applying an undercoat paint composition (X) comprising an antioxidant (a1) to a substrate to form an uncured first coating film; applying a topcoat paint composition (Y) comprising a carboxy-containing polymer (b1) and an epoxy-containing acrylic resin (b2) to the uncured first coating film to form an uncured second coating film; and then simultaneously heating the uncured first coating film and the uncured second coating film to cure the films. The present invention has been accomplished based on this finding.

The present invention includes the following.
Item 1. A multilayer coating film formation method for forming a multilayer coating film on a substrate, the method comprising the steps of:
applying an undercoat paint composition (X) comprising an antioxidant (a1) to a substrate to form at least one layer of an uncured first coating film;
applying a topcoat paint composition (Y) comprising a carboxy-containing polymer (b1) and an epoxy-containing acrylic resin (b2) to the first coating film to form an uncured second coating film; and
simultaneously heating the uncured first coating film and the uncured second coating film to cure the films.
Item 2. The multilayer coating film formation method according to Item 1, wherein the amount of the antioxidant (a1) is 0.1 to 10 parts by mass, per 100 parts by mass of the solids content of the undercoat paint composition (X).
Item 3. The multilayer coating film formation method according to Item 1 or 2, wherein the following steps (1) to (3) are performed in sequence:
step (1): applying an aqueous base coat paint composition (BC) to a substrate to form an uncured base coat coating film;
step (2): applying a clear coat paint composition (CC) to the uncured base coat coating film formed in step (1) to form an uncured clear coat coating film; and
step (3): simultaneously heating the uncured base coat coating film formed in step (1) and the uncured clear coat coating film formed in step (2) to cure the films,
wherein the base coat paint composition (BC) is the undercoat paint composition (X), and the clear coat paint composition (CC) is the topcoat paint composition (Y).
Item 4. The multilayer coating film formation method according to Item 3, wherein the aqueous base coat paint composition (BC) comprises an amine compound (a3).

Item 5. The multilayer coating film formation method according to Item 1 or 2, wherein the following steps (1) to (4) are performed in sequence:

step (1): applying an aqueous first colored paint (AC1) to a substrate to form an uncured first colored coating film;

step (2): applying an aqueous second colored paint (AC2) to the uncured first colored coating film formed in step (1) to form an uncured second colored coating film;

step (3): applying a clear coat paint composition (CC) to the uncured second colored coating film formed in step (2) to form an uncured clear coat coating film; and step (4) simultaneously heating the uncured first colored coating film, the uncured second colored coating film, and the uncured clear coat coating film formed in steps (1) to (3) to cure the films;

wherein at least one of the aqueous first colored paint (AC1) and the aqueous second colored paint (AC2) is the undercoat paint composition (X), and the clear coat paint composition (CC) is the topcoat paint composition (Y).

Item 6. The multilayer coating film formation method according to Item 5, wherein at least one of the aqueous first colored paint (AC1) and the aqueous second colored paint (AC2) comprises an amine compound (a3).

Item 7. The multilayer coating film formation method according to Item 4 or 6, wherein the amine compound (a3) is a tertiary amine.

Item 8, The multilayer coating film formation method according to any one of Items 1 to 7, wherein the topcoat paint composition (Y) further comprises an antioxidant having a phenyl group and a sulfide bond.

Advantageous Effects of Invention

The multilayer coating film obtained using the multilayer coating film formation method of the present invention has excellent acid resistance, smoothness, and gloss; and color change of the multilayer coating film over time after being left outdoors is significantly suppressed. Therefore, after a substrate of a vehicle or the like on which this multilayer coating film has been formed is baked, shipment can be promptly made in a short period of time, thus improving the production line efficiency.

DESCRIPTION OF EMBODIMENTS

The multilayer coating film formation method of the present invention is described in detail below.

In the present specification, the solids content in the paint composition refers to the non-volatile components remaining in the paint after drying at 110° C. for 1 hour. Thus, the solids contents of the paint composition can be calculated in the following manner. After an uncured paint composition is weighed out into a heat-resistant container, such as an aluminum foil cup, then applied and spread over the bottom of the container, the paint composition is dried at 110° C. for 1 hour, and the mass of the components of the paint composition remaining after drying is measured to determine the ratio of the mass of the components of the paint composition remaining after drying, relative to the total mass of the paint composition before drying.

1. Substrate

Examples of the substrate to be coated by the multilayer coating film formation method include, but are not limited to, exterior panel parts of vehicle bodies, such as passenger cars, trucks, motorcycles, and buses; vehicle components; exterior panel parts of household electric appliances, such as cellular phones and audio equipment; and the like. Of these substrates, exterior panel parts of vehicle bodies and vehicle components are preferable.

The material for the substrate is not particularly limited. Examples of the material include metallic materials, such as iron, aluminum, brass, copper, tin, stainless steel, galvanized steel, and steel plated with zinc alloys (Zn—Al, Zn—Ni, Zn—Fe, and the like); plastic materials such as various types of fiber-reinforced plastics (FRP), and resins such as polyethylene resins, polypropylene resins, acrylonitrile-butadiene-styrene (ABS) resins, polyimide resins, acrylic resins, vinylidene chloride resins, polycarbonate resins, polyurethane resins, and epoxy resins; inorganic materials such as glass, cement, and concrete; wood; textile materials such as paper and cloth; and the like. Of these materials, metallic materials and plastic materials are preferable, Usable substrates also include exterior panel parts of vehicle bodies, vehicle components, household electric appliances; or metallic base materials thereof, such as steel plates, whose metal surface has been subjected to a surface treatment, such as phosphate treatment, chromate treatment, or composite oxide treatment.

The substrate may or may not be surface-treated, and one or more coating film may be further formed thereon. For example, the substrate as a base material may be surface-treated, if necessary, and a primer film may be formed thereon; and an intermediate coating film may be further formed on the primer film. For example, when the substrate is a vehicle body, an primer film and an intermediate coating film can be formed by using a known paint composition usually used in the coating of vehicle bodies.

Specific examples of the primer paint composition for forming a primer film include electrodeposition paints, and preferably cationic electrodeposition paints. Examples of usable intermediate paint compositions for forming an intermediate coating film include paint compositions prepared by mixing a base resin having a crosslinkable functional group (e.g., a carboxy or hydroxy group), such as acrylic resin, polyester resin, alkyd resin, urethane resin, and epoxy resin; and a crosslinking agent such as an amino resin, such as melamine resin and urea resin, and a blocked or unblocked polyisocyanate compound, together with a pigment, a thickening agent, and other optional components. In addition, the primer film and/or the intermediate coating film may be an uncured coating film.

In the present specification, the phrase "applying the undercoat paint composition (X) to the substrate" includes not only the case of directly applying the undercoat paint composition (X) to the substrate, but also the case of applying the undercoat paint composition (X) after the substrate is appropriately surface-treated and/or one or more additional layers, such as a primer film and/or an intermediate coating film, are appropriately formed on the substrate.

2. Multilayer Coating Film Formation Method

The multilayer coating film formation method of the present invention is a method for forming a multilayer coating film on a substrate, the method comprising the steps of:

applying an undercoat paint composition (X) comprising an antioxidant (a1) to the substrate to form at least one layer of an uncured first coating film;

applying a topcoat paint composition (Y) containing a carboxy-containing polymer (b1) and an epoxy-containing acrylic resin (b2) to the first coating film to form an uncured second coating film; and simultaneously heating the uncured first coating film and the uncured second coating film to cure the films.

When the undercoat paint composition (X) is applied to a substrate, the undercoat paint composition (X) can be directly applied to the substrate, or indirectly applied via another coating film. When the topcoat paint composition (Y) is applied to the first coating film, the topcoat paint composition (Y) can be directly applied to the first coating film, or indirectly applied via another coating film.

With this configuration of the multilayer coating film, while the antioxidant (a1) incorporated in the undercoat paint composition (X) is more uniformly dissolved or dispersed in the first coating film, the first coating film and the second coating film are simultaneously heated to cure the films, whereby the antioxidant (a1) can suppress color change over time of the multilayer coating film that is left outdoors.

Undercoat Paint Composition (X)

The undercoat paint composition (X) contains an antioxidant (a1).

The antioxidant (a1) functions to suppress color change over time of the multilayer coating film that is left outdoor. The antioxidant (a1) may be a conventional antioxidant for preventing oxidative deterioration of polymers, and is not particularly limited. Examples include radical chain inhibitors (primary antioxidants), such as phenolic antioxidants and amine antioxidants; peroxide decomposers (secondary antioxidants), such as phosphorus-based antioxidants and sulfur-based antioxidants; and the like. For example, the antioxidant (a1) is at least one antioxidant selected from the group consisting of phenolic antioxidants, phosphite antioxidants, and thioether antioxidants.

Examples of phenolic antioxidants include 2,&-di-tert-butylphenol, 2,4-di-tert-butylphenol, 2-tert-butyl-4,6-dimethylphenol, 2,6-di-tert-butyl-4-methylphenol, 2,6-di-tert-butyl-4-ethylphenol, 2,4,6-tri-tert-butylphenol, 2,6-tert-butyl-4-hydroxymethylphenol, 2,6-di-tert-butyl-2-dimethylamino-p-cresol, n-octadecyl-3-(3',5'-di-tert-butyl-4'-hydroxyphenyl)propionate, styrenated phenol, 2,2'-methylene-bis-(4-methyl-6-tert-butylphenol), 2,2'-methylene-bis-(6-cyclohexyl-4-methylphenol), 2,2'-butylidene-bis-(2-tert-butyl-4-methylphenol), 4,4'-methylene-bis-(2,6-di-tert-butylphenol), 1,6-hexanediol-bis-[3-(3,5-di-tert-butyl-4-hydroxyphenyl)propionate], tris(3,5-di-tert-butyl-4-hydroxybenzyl)isocyanurate, tetrakis[methylene-3-(3',5')-di-tert-butyl-4'-hydroxyphenyl)propionate]methane, 1,1,3-tris(2-methyl-4-hydroxy-5-tert-butylphenyl) butane, 3,9-bis[1,1-di-methyl-2-[β-(3-tert-butyl-4-hydroxy-5-methylphenyl)propionyloxy]ethyl]-2,4,8,10-tetraoxaspiro[5,5]undecane, and the like.

Examples of the phosphite antioxidant include tris(isodecyl)phosphite, tris(tridecyl)phosphite, phenyldiisodecyl phosphite, diphenyl isooctyl phosphite, triphenyl phosphite, tris(nonylphenyl)phosphite, 4,4'-isopropylidene-diphenol alkylphosphite, tris(mono- and di-mixed nonylphenyl)phosphite, tris(2,4-di-tert-butylphenyl)phosphite, distearyl pentaerythritol diphosphite, di(2,4-di-tert-butylphenyl)pentaerythritol diphosphite, di(nonylphenyl)pentaerythritol diphosphite, phenyl-bisphenol A pentaerythritol diphosphite, tetratridecyl-4,4'-butylidene bis-(3-methyl-6-tert-butylphenol)-di-phosphite, hexatridecyl 1,1,3-tris(2-methyl-4-hydroxy-5-tert-butylphenyl)butane triphosphite, and the like.

Examples of thioether antioxidants include dilauryl-3,3'-thiodipropionate, ditridecyl-3,3'-thiodipropionate, dimyristyl-3,3'-thiodipropionate, distearyl-3,3'-thiodipropionate, bis[2-methyl-4-(3-n-alkylthiopropionyloxy)-5-tert-butylphenyl]sulfide, pentaerythritol-tetrakis-(β-lauryl-thio-propionate), 2-mercaptobenzimidazole, and the like.

The antioxidant (a1) is preferably an antioxidant having a phenyl group and a sulfide bond, The antioxidant having a phenyl group and a sulfide bond can be any of a wide range of antioxidants, as long as the antioxidant has a phenyl group and a sulfide bond. Specific examples of the antioxidant having a phenyl group and a sulfide bond (C) include 4-[[4,6-bis(octylthio)-1,3,5-triazin-2-yl]amino]-2,6-di-tert-butylphenol (Irganox (registered trademark) 565), 2,2'-thiodiethylbis[3-(3,5-di-tert-butyl-4-hydroxyphenyl)propionate] (Irganox (registered trademark) 1035), 2,4-bis(octylthiomethyl)-6-methylphenol (Irganox (registered trademark) 1520L), 2,4-bis(dodecylthiomethyl)-6-methylphenol (Irganox (registered trademark) 1726), and the like. All of these from the Irganox (registered trademark) series are available from BASF Japan, Ltd. These antioxidants can be used singly, or in a combination of two or more, From the viewpoint of suppressing color change over time of a multilayer coating film that is left outdoors, the amount of antioxidant (a1) is preferably 0.1 parts by mass or more, per 100 parts by mass of the solids content of the base coat paint composition. From the viewpoint of preventing a reduction in durability of the coating film formed of the undercoat paint composition (X) and a multilayer coating film comprising the coating film, the amount of antioxidant (C) is preferably 10 parts by mass or less, and more preferably 3 parts by mass or less, per 100 parts by mass of the solids content of the undercoat paint composition (X).

From the viewpoint of suppressing color change over time of the multilayer coating film that is left outdoors, the amount of antioxidant (a1) is preferably 0.1 parts by mass or more, per 100 parts by mass of the binder component (a2) of the undercoat paint composition (X) described below, From the viewpoint of preventing a reduction in curability of the coating film formed of the undercoat paint composition (X) and a multilayer coating film comprising the coating film, the amount of the antioxidant is preferably 10 parts by mass or less, and more preferably 3 parts by mass or less.

The undercoat paint composition (X) can contain a binder component (a2). Examples of the binder component (a2) include, but are not limited to, base resins, such as acrylic resins, polyester resins, alkyd resins, epoxy resins, and urethane resins, which have a crosslinkable functional group, such as a carboxy and hydroxy group; and crosslinking agents such as amino resins, such as melamine resins and urea resins, and blocked or unblocked polyisocyanate compounds.

The undercoat paint composition (X) can contain an amine compound (a3) and other additives, such as pigments.

The amine compound (a3) is preferably a tertiary amine from the viewpoint of the distinctness of image of the obtained multilayer coating film. Examples of tertiary amines include trimethylamine (TMA), dimethylethylamine (DMSA), 2-dimethylaminoethanol (DMAE), tetramethylethylenediamine (TMED), N,N-dimethylaniline (DMAN), 1-methylpiperidine (MPTP), and the like; and 2-dimethylaminoethanol (DMAE) is preferable.

When the undercoat paint composition (X) contains the above amine compound (a3), the amount of the amine compound (a3) in the undercoat paint composition (X) is preferably 20 parts by mass or less, more preferably 15 parts by mass or less, and still more preferably 0.1 to 10 parts by mass, per 100 parts by mass of the solids content of the undercoat paint composition (X).

Examples of the pigment include color pigments, extender pigments, effect pigments, and the like. These pigments can be used singly, or in a combination of two or more.

Examples of color pigments include titanium oxide, zinc oxide, carbon black (including conductive carbon black), molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and the like.

Examples of extender pigments include talc, clay, kaolin, barium oxide, barium sulfate, barium carbonate, calcium carbonate, silica, alumina white, and the like.

Examples of effect pigments include non-leafing or leafing aluminum (including vapor-deposited aluminum), copper, zinc, brass, nickel, glass flakes, graphite flakes, aluminum oxide, mica, titanium oxide- or iron oxide-coated aluminum oxide, titanium oxide- or iron oxide-coated mica, and the like. Among them, at least one effect pigment selected from the group consisting of aluminum oxide, mica, titanium oxide- or iron oxide-coated aluminum oxide, and titanium oxide- or iron oxide-coated mica is preferably used. These effect pigments may be used singly, or in a combination of two or more.

Examples of other additives include UV absorbers, light stabilizers, antifoaming agents, thickeners, anticorrosives, surface modifiers, pigment dispersants, and the like.

Examples of UV absorbers include known UV absorbers, such as benzotriazole UV absorbers, triazine UV absorbers, salicylic acid derivative UV absorbers, and benzophenone UV absorbers. Incorporating a UV absorber can improve, for example, the weather resistance of the coating film, and suppression of color change of the coating film after long-term (e.g., 1 year or more) UV radiation, The amount of the UV absorber is usually 0 to 10 parts by mass, preferably 0.2 to 5 parts by mass, and more preferably 0.3 to 2 parts by mass, per 100 parts by mass of the total of the resin components in the undercoat paint composition (X).

Examples of light stabilizers include known light stabilizers, such as hindered amine light stabilizers. Using a light stabilizer can improve, for example, the weather resistance of the coating film, and suppression of color change of the coating film after long-term (e.g., 1 year or more) UV irradiation. The amount of the light stabilizer is usually 0 to 10 parts by mass, preferably 0.2 to 5 parts by mass, and more preferably 0.3 to 2 parts by mass, per 100 parts by mass of the total of the resin components in the undercoat paint composition (X).

The solids content of the undercoat paint composition (X) can be usually 60% by mass or less, and the solids content at the time of application can be usually 10 to 50% by mass.

Topcoat Paint Composition (Y)

The topcoat paint composition (Y) comprises a carboxy-containing polymer (b1) and an epoxy-containing acrylic resin (b2).

Carboxy-Containing Polymer (b1)

Examples of the carboxy-containing polymer (b1) include known carboxy-containing polymers. Preferable examples of the carboxy-containing polymer (b1) include a vinyl polymer having a half-esterified acid anhydride group (b1-1) and a carboxy-containing polyester polymer (b1-2).

Vinyl Polymer Having a Half-Esterified Acid Anhydride Group (b1-1)

The term "half-esterified acid anhydride group" as used herein means a group comprising carboxy and carboxylate ester that is obtained by adding an aliphatic monohydric alcohol to an acid, anhydride group to perform ring opening (i.e., half-esterification). This group is hereinafter sometimes simply referred to as a "half-ester group."

The polymer (b1-1) can be easily obtained by, for example, copolymerizing a half-ester group-containing vinyl monomer with other vinyl monomers by a standard method. The polymer (b1-1) can also be easily obtained by performing copolymerization in a similar manner using an acid anhydride group-containing vinyl monomer in place of the half-ester group-containing vinyl monomer, and then half-esterifying the acid anhydride group. The polymer (b1-1) can also be obtained by performing copolymerization in a similar manner using a hydroxy-containing vinyl monomer in place of the half-ester group-containing vinyl monomer, and then half-esterifying the hydroxy group.

Examples of the half-ester group-containing vinyl monomer include compounds obtained by half-esterifying acid anhydride groups of acid anhydride group-containing vinyl monomers; compounds obtained by adding acid anhydrides to hydroxy-containing vinyl monomers by half-esterification; and the like.

Specific examples of compounds obtained by half-esterifying acid anhydride groups of acid anhydride group-containing vinyl monomers include monoesters of vinyl monomers having an acid anhydride group, such as maleic anhydride and itaconic anhydride, with aliphatic monoalcohols; and the like.

Specific examples of compounds obtained by adding acid anhydrides to hydroxy-containing vinyl monomers by half-esterification include compounds obtained by adding, by half-esterification, acid anhydrides, such as phthalic anhydride and hexahydrophthalic anhydride, to hydroxy-containing vinyl monomers that are mentioned below as examples of other vinyl monomers.

The half-esterification can be performed either before or after the copolymerization reaction, as described above. Examples of aliphatic monohydric alcohols that can be used for the half-esterification include low-molecular-weight monohydric alcohols, such as methanol, ethanol, isopropanol, tert-butanol, isobutanol, ethylene glycol monomethyl ether, and ethylene glycol monoethyl ether. The half-esterification reaction can be performed by a usual method, at a temperature in the range of room temperature to about 80° C., using, if necessary, a tertiary amine as a catalyst. In the present specification, room temperature refers to 20° C.

Examples of other vinyl monomers described above include hydroxy-containing vinyl monomers; (meth)acrylic acid esters; vinyl ethers and allyl ethers; olefinic compounds and diene compounds; nitrogen-containing unsaturated monomers; styrene, α-methylstyrene, vinyltoluene, and the like.

Examples of hydroxy-containing vinyl monomers include $C_2$-$C_8$ hydroxyalkyl esters of acrylic or methacrylic acid, such as 2-hydroxyethyl (meth)acrylate, 3-hydroxypropyl (meth)acrylate, and 4-hydroxybutyl (meth)acrylate; monoesters of polyether polyols, such as polyethylene glycol, polypropylene glycol, and polybutylene glycol, with unsaturated carboxylic acids, such as (meth)acrylic acid; monoethers of polyether polyols, such as polyethylene glycol, polypropylene glycol, and polybutylene glycol, with hydroxy-containing unsaturated monomers, such as 2-hydroxyethyl (meth)acrylate; diesters of acid anhydride group-containing unsaturated compounds, such as maleic anhydride and itaconic anhydride, with glycols, such as ethylene glycol, 1,6-hexanediol, and neopentyl glycol; hydroxyalkyl vinyl ethers, such as hydroxyethyl vinyl ether; allyl alcohol, and the like; 2-hydroxypropyl (meth)acrylate; adducts of α,β-unsaturated carboxylic acids with monoepoxy compounds, such as "Cardura E10" (tradename; produced by Shell Petrochemical Co., Ltd.) and α-olefin epoxide; adducts of glycidyl (meth)acrylate with monobasic acids, such as acetic acid, propionic acid, p-tert-butylbenzoic acid, and aliphatic acids; adducts of the above hydroxy-containing monomers with lactones ε-caprolactone, γ-valerolactone); and the like.

In the present specification, "(meth)acrylate" means "acrylate or methacrylate"; "(meth)acrylic acid" means "acrylic acid or methacrylic acid"; and "(meth)acrylamide" means "acrylamide or methacrylamide."

Examples of (meth)acrylic acid esters include $C_1$-$C_{24}$ alkyl esters or cycloalkyl esters of acrylic or methacrylic acid, such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, test-butyl methacrylate, hexyl methacrylate, 2-ethylhexyl methacrylate, octyl methacrylate, decyl methacrylate, lauryl methacrylate, and stearyl methacrylate; $C_2$-$C_{18}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate, and ethoxybutyl methacrylate; and the like.

Examples of vinyl ethers and allyl ethers include linear or branched alkyl vinyl ethers, such as ethyl vinyl ether, n-propyl vinyl ether, isopropyl vinyl ether, n-butyl vinyl ether, tort-butyl vinyl ether, pentyl vinyl ether, hexyl vinyl ether, and octyl vinyl ether; cycloalkyl vinyl ethers, such as cyclopentyl vinyl ether and cyclohexyl vinyl ether; allyl vinyl ethers, such as phenyl vinyl ether and trivinyl ether; aralkyl vinyl ethers, such as benzyl vinyl ether and phenethyl vinyl ether; allyl ethers, such as allyl glycidyl ether and allyl ethyl ether; and the like.

Examples of olefin compounds and diene compounds include ethylene, propylene, butylene, vinyl chloride, butadiene, isoprene, chloroprene, and the like.

Examples of nitrogen-containing unsaturated monomers include nitrogen-containing alkyl (meth)acrylates, such as N,N-dimethylaminoethyl (meth)acrylate, N,N-diethylaminoethyl (meth)acrylate, and N-test-butylaminoethyl (meth) acrylate; polymerizable amides, such as acrylamide, methacrylamide, N-methyl (meth)acrylamide, N-ethyl (meth) acrylamide, N,N-dimethyl (meth)acrylamide, N,N-dimethylaminopropyl (meth)acrylamide, and N,N-dimethylaminoethyl (meth)acrylamide; aromatic nitrogen-containing monomers, such as 2-vinylpyridine, 1-vinyl-2-pyrrolidone, and 4-vinyl-pyridine; polymerizable nitriles, such as acrylonitrile and methacrylonitrile; allylamines; and the like.

A mixture of the various monomers mentioned above can be copolymerized by a general method for copolymerizing vinyl monomers. In view of versatility and cost, a solution radical polymerization in an organic solvent is preferable. More specifically, when the solution radical polymerization method is used, a desired copolymer can be easily obtained by performing a copolymerization reaction of a monomer mixture within a temperature range of about 60 to 165° C. in an organic solvent in the presence of a polymerization initiator. Examples of the organic solvent include aromatic hydrocarbon solvents, such as xylene and toluene; ketone solvents, such as methyl ethyl ketone and methyl isobutyl ketone; ester solvents, such as ethyl acetate, butyl acetate, isobutyl acetate, and 3-methoxybutyl acetate; alcohol solvents, such as n-butanol and isopropyl alcohol; and the like.

The proportions of the half ester group- or acid anhydride group-containing vinyl monomer and other vinyl monomers used in the copolymerization are usually as follows, relative to the total amount of the monomers used: in view of the balance between the curing reactivity and storage stability of the obtained copolymer, the proportion of the half ester group- or acid anhydride group-containing vinyl monomer is preferably about 5 to 40 mass, and more preferably about 10 to 30 mass %; and the proportion of other vinyl monomers is preferably about 60 to 95 mass %, and more preferably about 70 to 90 mass %. When an acid anhydride group-containing vinyl monomer is used, a half-esterification reaction is performed after the copolymerization reaction, as described above.

The vinyl polymer having a half-esterified acid anhydride group (b1-1) is preferably an acrylic polymer that has a number average molecular weight of about 1000 to 10000, particularly preferably about 1200 to 7000; and preferably has an acid value of about 50 to 250 mg KOH/g, particularly preferably about 100 to about 200 mg KOH/g, in view of excellent compatibility with the epoxy-containing acrylic resin (b2) and excellent gloss and acid resistance of the resulting coating film of the paint composition comprising this component (b1-1).

Carboxy-Containing Polyester Polymer (b1-2)

The carboxy-containing polyester polymer can be easily obtained by a condensation reaction of a polyhydric alcohol with a polycarboxylic acid. For example, the carboxy-containing polyester polymer can be obtained by a one-step reaction under conditions such that carboxy groups of the polycarboxylic acid are present in excess. Alternatively, the carboxy-containing polyester polymer can also be obtained by first synthesizing a hydroxy-terminated polyester polymer under conditions such that hydroxy groups of the polyhydric alcohol are present in excess, and then adding an acid anhydride group-containing compound.

Examples of the polyhydric alcohol include ethylene glycol, butylene glycol, 1,6-hexanediol, 2-butyl-2-ethyl-1,3-propanediol, 3-methyl-1,5-pentanediol, trimethylolpropane, pentaerythritol, and the like. Examples of polycarboxylic acids include adipic acid, terephthalic acid, isophthalic acid, phthalic anhydride, hexahydrophthalic anhydride, and the like, Examples of acid anhydride group-containing compounds include phthalic anhydride, hexahydrophthalic anhydride, succinic anhydride, and the like.

The number average molecular weight of the polyester (b1-2) is not particularly limited. The polyester (b1-2) preferably has a number average molecular weight of about 500 to 10000, particularly preferably about 800 to 5000, in view of excellent compatibility with the epoxy-containing acrylic resin (b2), and excellent gloss and acid resistance of the resulting coating film of the paint composition comprising this component (b1-2), To improve the compatibility of the carboxy-containing polyester polymer (b1-2) with the epoxy-containing acrylic resin (b2) and to enhance the adhesion, of the coating film of the paint composition containing this component (b1-2), hydroxy groups can be introduced into the polymer (b1-2) to such an extent that the polymer (b1-2) has a hydroxy value of about 100 mg KOH/g or less. When the conditions are such that carboy groups are present in excess, hydroxy groups can be introduced by, for example, terminating the condensation reaction during the course thereof; and when the conditions are such that hydroxy groups are present in excess, hydroxy groups can be easily introduced by first synthesizing a hydroxy-terminated polyester polymer, and then adding an acid anhydride group-containing compound so that the amount of acid groups is smaller than that of hydroxy groups.

Examples of particularly preferable carboxy-containing polyester polymers include the carboxy-containing, high-acid-value polyesters described below. The term "high-acid-value polymer" as used herein generally means a polymer with an acid value of more than 70 mg KOH/g.

The carboxy-containing, high-acid-value polyester can be easily obtained by performing an esterification reaction of a polyhydric alcohol with a polycarboxylic acid or a lower alkyl ester thereof, under conditions such that the amount of hydroxy groups is in excess of the amount of carboxy groups, to obtain a polyester polyol; and then subjecting the polyester polyol to a half-esterification reaction with an acid anhydride group-containing compound. The carboxy group herein includes acid anhydride groups. When the amount of carboxy groups is calculated, 1 mole of acid anhydride groups is counted as 2 moles of carboxy groups. The esterification reaction may be either a condensation reaction, or a transesterification reaction.

The above polyester polyol can be obtained under conventional esterification reaction conditions. The polyester polyol preferably has a number average molecular weight of about 350 to 4,700, particularly preferably about 400 to 3,000; and preferably has a hydroxy value of about 70 to 400 mg KOH/g, particularly preferably about 150 to 350 mg KOH/g. The half-esterification reaction of the polyester polyol can be performed by a usual method, usually at a temperature in the range of room temperature to about 80° C., using, if necessary, a tertiary amine as a catalyst.

Examples of the polyhydric alcohols include ethylene glycol, butylene glycol, 1,6-hexanediol, trimethylolpropane, pentaerythritol, and the like. Examples of polycarboxylic acids include adipic acid, sebacic acid, terephthalic acid, isophthalic acid, phthalic anhydride, hexahydrophthalic anhydride, trimellitic anhydride, and the like. Examples of acid anhydride group-containing compounds include phthalic anhydride, hexahydrophthalic anhydride, succinic anhydride, trimellitic anhydride, and the like.

The carboxy-containing, high-acid-value polyester preferably has a number average molecular weight of about 800 to 5,000, and particularly preferably about 900 to 4,000, and preferably has an acid value of about 80 to 300 mg KOH/g, and more preferably about 100 to 250 mg KOH/g.

When the carboxy-containing polymer (b) comprises a vinyl polymer having a half-esterified acid anhydride group (b1-1) and a carboxy-containing polyester polymer (b1-2), the ratio of the vinyl polymer having a half-esterified acid anhydride group (b1-1) to the carboxy-containing polyester polymer (b1-2) is not particularly limited, but is preferably in the range of 99:1 to 1:99, more preferably 97:3 to 50:50, and still more preferably 95:5 to 60:40, in terms of mass ratio.

Epoxy-Containing Acrylic Resin (b2)

The epoxy-containing acrylic resin (b2) functions as a crosslinking-curing agent for the carboxy-containing polymer (b1).

The epoxy-containing acrylic resin (b2) may contain, in addition to an epoxy group, an alkoxysilyl group. When the epoxy-containing acrylic resin (b2) contains an alkoxysilyl group, the coating film of the composition containing the epoxy-containing acrylic resin (b2) has a higher crosslinking density, and advantageously has improved scratch resistance and stain resistance The acrylic resin (b2) can be synthesized by copolymerizing an epoxy-containing vinyl monomer and other vinyl monomers; or copolymerizing an epoxy-containing vinyl monomer, an alkoxysilyl-containing vinyl monomer, and other vinyl monomers.

Examples of epoxy-containing vinyl monomers include glycidyl (meth)acrylate, allyl glycidyl ether, 3,4-epoxycyclohexylmethyl (meth)acrylate, and the like.

Examples of alkoxysilyl-containing vinyl monomers include vinyltrimethoxysilane, vinylmethyldimethoxysilane, vinyltriethoxysilane, vinylmethyldiethoxysilane, vinyltris(2-methoxyethoxy)silane, γ-(meth)acryloyloxypropyltrimethoxysilane, γ-(meth)acryloyloxypropylmethyldimethoxysilane, vinyltriacetoxysilane, β-(meth)acryloyloxyethyltrimethoxysilane, γ-(meth)acryloyloxypropyltriethoxysilane, γ-(meth)acryloyloxypropylmethyldiethoxysilane, and the like. Among these, alkoxysilyl-containing vinyl monomers in which the alkoxysilyl groups are ethoxysilyl groups are preferable in view of excellent low-temperature curability and storage stability, and examples include vinyltriethoxysilane, vinylmethyldiethoxysilane, γ-(meth)acryloyloxypropyltriethoxysilane, γ-(meth)acryloyloxypropylmethyldiethoxysilane, and the like.

Examples of other vinyl monomers are the same as those mentioned in the description of the polymer (b1).

As the copolymerization method for producing the epoxy-containing acrylic resin (b2), the copolymerization method mentioned in the description of the polymer (b1) can be used.

To improve the compatibility of the epoxy-containing acrylic resin (b2) with the carboxy-containing polymer (b1), and to obtain a coating film with improved adhesion from the composition containing the acrylic resin (b2), hydroxy groups can be introduced into the acrylic resin to such an extent that the acrylic resin has a hydroxy value of about 150 mg KOH/g or less.

Hydroxy groups can be introduced by performing copolymerization using a hydroxy-containing vinyl monomer as a comonomer component. Examples of hydroxy-containing vinyl monomers are the same as those mentioned in the description of the polymer (b1).

When the epoxy-containing vinyl monomer and other vinyl monomers are copolymerized, the amount of the epoxy-containing vinyl monomer is preferably about 5 to 80 mass %, and more preferably about 10 to 65 masse, from the viewpoint of the balance between the curing reactivity and storage stability of the obtained copolymer. The proportion of other vinyl monomers is preferably about 20 to 95 mass %, and more preferably about 35 to 90 mass %.

When the epoxy-containing vinyl monomer, alkoxysilyl-containing vinyl monomer, and other vinyl monomers are copolymerized, it is usually preferable to use the monomers in the following proportions, per the total amount of the monomers used: the proportion of the epoxy-containing vinyl monomer is preferably about 5 to 60 mass %, and particularly preferably about 10 to 40 mass %, from the viewpoint of the balance between the curing reactivity and storage stability of the obtained copolymer; the proportion of the alkoxysilyl-containing vinyl monomer is preferably about 3 to 40 masse, and particularly preferably about 5 to 30 mass %, from the viewpoint of excellent curing reactivity of the obtained copolymer, and excellent scratch resistance of the coating film formed of the paint composition containing the alkoxysilyl-containing vinyl monomer; and the proportion of other vinyl monomers is preferably about 10 to 80 mass %, and particularly preferably about 20 to 50 mass %.

The epoxy content of the acrylic resin (b2) is preferably about 0.5 to 5.5 mmol/g, and more preferably about 0.8 to 4.5 mmol/g, from the viewpoint of excellent compatibility of the acrylic resin (b2) with the carboxy-containing polymer (b1); excellent curability of the resulting paint composition; and excellent acid resistance and scratch resistance of the obtained coating film.

When the acrylic resin (b2) has an alkoxysilyl group, the amount of the alkoxysilyl group is preferably about 0.3 to 5.0 mmol/g, and more preferably about 0.8 to 3.5 mmol/g, to achieve excellent storage stability of the resulting paint composition, and excellent acid resistance and scratch resistance of the coating film of the paint composition.

In view of excellent compatibility of the acrylic resin (b2) with the carboxy-containing polymer (b1), and excellent acid resistance and scratch resistance of the obtained coating film, the acrylic resin (b2) preferably has a number average molecular weight of about 1000 to 10000, and more preferably about 1200 to 7000.

In view of excellent curability of the topcoat paint composition (Y), the proportions of the carboxy-containing polymer (b1) and the epoxy-containing acrylic resin (b2) are preferably such that the equivalent ratio of carboxy groups in the component (b1) to epoxy groups in the component (b2) is in the range of about 1:0.5 to 0.5:1, and more preferably about 1:0.6 to 0.6:1.

Further, in view of excellent scratch resistance, hardness, and stain resistance of the coating film, the proportions of the carboxy-containing polymer (b1) and epoxy-containing polymer (b2) are preferably such that the proportion of the component (b1) is about 20 to 80% by mass, and more preferably about 35 to 65% by mass; and the proportion of component (b2) is about 80 to 20% by mass, and more preferably about 65 to 35% by mass, per 100% by mass of the total of the components (b1) and (b2).

In view of excellent acid resistance of the coating film, the proportion of the total amount of the carboxy-containing polymer (b1) and epoxy-containing acrylic resin (b2) in the topcoat paint composition (Y) is, on a solids basis, preferably 70% by mass or more, more preferably 75 to 98% by mass, and particularly preferably 80 to 95% by mass. Further, when the topcoat paint composition (Y) contains, as at least one of the carboxy-containing polymer (b1), the vinyl polymer having a half esterified acid anhydride group (b1-1), the proportion of the total amount of the vinyl polymer having a half-esterified acid anhydride group (b1-1) and the epoxy-containing acrylic resin (b2) in the topcoat paint composition (Y), on a solids basis, is preferably 70% by mass or more, preferably 72 to 98% by mass, and more preferably 75 to 95% by mass, from the viewpoint of excellent acid resistance of the coating film.

The topcoat paint composition (Y) may or may not contain the antioxidant (b3) The topcoat paint composition (Y) preferably contains an antioxidant (b3).

The antioxidant (b3) in the topcoat paint composition (Y) may be the same as, or different from, the antioxidant (a1) in the undercoat paint composition (X).

The antioxidant (b3) may be a conventional antioxidant for preventing oxidative deterioration of the polymer. Examples of antioxidants include, but are not limited to, radical chain inhibitors (primary antioxidants), such as phenol antioxidants and amine antioxidants; and peroxide decomposers (secondary antioxidants), such as phosphorus antioxidants and sulfur antioxidants. The antioxidant (b3) may be, for example, at least one antioxidant selected from the group consisting of phenolic antioxidants, phosphite antioxidants, and thioether antioxidants.

Specific examples of the phenolic antioxidants, phosphite antioxidants, and thioether antioxidants are as explained in the description of the antioxidant (a1).

The antioxidant (b3) functions to suppress color change over time of a multilayer coating film that is left outdoors. Preferably, the antioxidant (b3) is an antioxidant having a phenyl group and a sulfide bond. Specific examples of the antioxidant having a phenyl group and a sulfide bond are as explained regarding the antioxidant having a phenyl group and a sulfide bond in the antioxidant (a1).

To suppress color change over time of a multilayer coating film that is left outdoor, the amount of the antioxidant (b3) is preferably 0.1 parts by mass or more per 100 parts by mass of the solids content of the topcoat paint composition (Y), To prevent the reduction of curability of the coating film formed of the topcoat paint composition (Y) and the multilayer coating film comprising this coating film, the amount of the antioxidant (b3) is preferably 10 parts by mass or less, and even more preferably 3 parts by mass or less, per 100 parts by mass of the solids content of the topcoat paint composition (Y).

The amount of the antioxidant (b3) is preferably in the range of 0.1 to 10 parts by mass, and preferably 0.1 to 3 parts by mass, per 100 parts by mass of the solids content of the topcoat paint composition (Y).

The topcoat paint composition (Y) can contain a curing catalyst, if necessary. Examples of curing catalysts include those that are effective for the crosslinking reaction of carboxy groups and epoxy groups, such as tetraethylammonium bromide, tetrabutylammonium bromide, tetraethylammonium chloride, tetrabutylphosphonium bromide, triphenylbenzylphosphonium chloride, and like quaternary salt catalysts; triethylamine, tributylamine, and like amines; and the like. Among these, quaternary salt catalysts are preferable. A mixture of substantially equivalent amounts of a quaternary salt and a phosphoric acid compound, such as monobutyl phosphate or dibutyl phosphate, is particularly preferable, because such a mixture can improve the storage stability of the paint composition and prevent the decrease of spray coating suitability caused by a reduction of electric resistance of the paint composition, while retaining the catalytic action.

The topcoat paint composition (Y) may contain a dehydrating agent, such as trimethyl orthoacetate, in order to suppress the deterioration of the paint caused by moisture that is present in the paint and in the air.

The topcoat paint composition (Y) may contain known pigments, such as color pigments, extender pigments, and effect pigments, if necessary.

Examples of the color pigments, extender pigments, and effect pigments include those mentioned in the description of the undercoat paint composition (X). These pigments may be used alone, or in a combination of two or more.

The topcoat paint composition (Y) may further contain, if necessary, various resins other than the carboxy-containing polymer (b1) and the epoxy-containing acrylic resin (b2), such as acrylic resins, polyester resins, alkyd resins, and fluorine resins. To enhance the curability, the composition may also contain a curing agent, such as a melamine resin or a blocked polyisocyanate compound. Further, it is also possible to add commonly used additives for paints, such as UV absorbers, light stabilizers, surface modifiers, and antifoaming agents, if necessary.

Examples of additives that can be incorporated in the topcoat paint composition (Y) include those mentioned in the description of the undercoat paint composition (X).

Examples of usable UV absorbers are known UV absorbers, such as benzotriazole UV absorbers, triazine UV absorbers, salicylic acid derivative UV absorbers, and benzophenone UV absorbers. Incorporating a UV absorber can improve, for example, weather resistance of the coating film, and suppression of color change of the coating film after long-term (e.g., 1 year or more) UV irradiation.

The amount of the UV absorber is usually 0 to 10 parts by mass, preferably 0.2 to 5 parts by mass, and more preferably 0.3 to 2 parts by mass, per 100 parts by mass of the total of the resin components in the topcoat paint composition (Y).

Examples of usable light stabilizers include known light stabilizers, such as hindered amine light stabilizers. Incorporating a stabilizer can improve, for example, weather resistance of the coating film, and suppression of color change of the coating film after long-term (e.g., 1 year or more) UV irradiation.

The amount of the light stabilizer is usually 0 to 10 parts by mass, preferably 0.2 to 5 parts by mass, and more preferably 0.3 to 2 parts by mass, per 100 parts by mass of the total of the resin components in the topcoat paint composition (Y).

The form of the topcoat paint composition (Y) is not particularly limited. It is usually preferable that the composition be used as an organic solvent-based paint composition. In that case, examples of usable organic solvents include various organic solvents for paints, such as aromatic or aliphatic hydrocarbon solvents; alcohol solvents; ester solvents; ketone solvents; and ether solvents.

The topcoat paint composition (Y) can be prepared by mixing, by known methods, the carboxy-containing polymer (b1) and the epoxy-containing acrylic resin (b2) optionally with an antioxidant (b3), a curing catalyst, a pigment, various resins, a UV absorber, a light stabilizer, and an organic solvent.

It is usually preferable that the solids content of the topcoat paint composition (Y) is in the range of generally 30 to 70% by mass, and more preferably 40 to 60% by mass.

3. Various Embodiments of Multilayer Coating Film Formation Method

The multilayer coating film formation method of the present invention can be, for example, a method comprising the following steps.

The multilayer coating film formation method according to one embodiment is a method comprising performing the following steps (1) to (3) in sequence;

step (1): applying an aqueous base coat paint composition (BC) to a substrate to form an uncured base coating film;

step (2): applying a clear coat paint composition (CC) to the uncured base coat coating film formed in step (1) to form an uncured clear coat coating film; and step (3): simultaneously heating the uncured base coat coating film formed in step (1) and the uncured clear coat coating film formed in step (2) to cure the films, wherein the base coat paint composition (BC) is an undercoat paint composition (X), and the clear coat paint composition (CC) is a topcoat paint composition (Y).

In step (1), the base coat coating film may comprise one layer, or two or more layers. In step (2), the clear coat coating film may comprise one layer, or two or more layers.

The base coat paint composition (BC) contains the antioxidant (a1) and may optionally further contain an amine compound (a3) and other additives, such as pigments, as explained in the section "Undercoat Paint Composition (X)"

The clear coat paint composition (CC) contains a carboxy-containing polymer (b1) and an epoxy-containing acrylic resin (b2), as explained in the section "Topcoat Paint Composition (Y)."

The aqueous base coat paint composition (BC) and clear coat paint composition (CC) can be applied to a substrate, for example, by air spray coating, airless spray coating, rotary atomization coating, or curtain coating. In air spray coating, airless spray coating, and rotary atomization coating, an electrostatic charge may be applied, if necessary. Among these, air spray coating and rotary atomization coating are particularly preferable.

In step (3), heating can be performed by known means, for example, by using a hot-air furnace, electric furnace, infrared induction heating furnace, or like drying furnace.

The heating temperature is preferably in the range of 70 to 180° C., and more preferably 80 to 160° C.

The heating time is not particularly limited, and is preferably in the range of 10 to 40 minutes, more preferably 20 to 30 minutes. The curing (baking) time can be changed depending on, for example, the curing temperature. The curing time is preferably in the range of about 10 to 40 minutes at 100 to 160° C.

In general, the base coat coating film formed of the aqueous base coat paint composition (BC) preferably has a dry film thickness of about 5 to 40 μm, and particularly preferably about 10 to 30 μm. A dry film thickness of 5 μm or more is advantageous in terms of concealing the substrate. A dry film thickness of 40 μm or less is advantageous in terms of coating operation, because popping and sagging are less likely to occur.

In general, the clear coat coating film of the clear coat paint composition (CC) preferably has a dry film thickness of about 10 to 80 μm, and particularly preferably about 15 to 60 μm. A dry film thickness of 10 μm or more is advantageous in terms of weather resistance of the coating film. A dry film thickness of 80 μm or less is advantageous in terms of coating operation because popping and sagging are less likely to occur.

The multilayer coating film formation method according to another embodiment comprises performing the following steps (1) to (4) in sequence:

step (1): applying an aqueous first colored paint (AC1) to a substrate to form an uncured first colored coating film;

step (2): applying an aqueous second colored paint (AC2) to the uncured first colored coating film formed in step (1) to form an uncured second colored coating film, step (3) applying a clear coat paint composition (CC) to the uncured second colored coating film formed in step (2) to form an uncured clear coat coating film; and step (4): simultaneously heating the uncured first colored coating film, the uncured second colored coating film, and the uncured clear coat coating film formed in steps (1) to (3) to cure the films;

wherein at least one of the aqueous first colored paint (AC1) and the aqueous second colored paint (AC2) is the undercoat paint composition (X); and the clear coat paint composition (CC) is the topcoat paint composition (Y).

As explained in the section "Undercoat Paint Composition (X)," at least one of the aqueous first colored paint (AC1) and the aqueous second colored paint (AC2) contains the antioxidant (a1), and may further optionally contain an amine compound (a3) and other additives, such as a pigment.

The clear coat paint composition (CC) comprises a carboxy-containing polymer (b1) and an epoxy-containing acrylic resin (b2), as explained in the section "Topcoat Paint Composition (Y)."

In a specific embodiment of the multilayer coating film formation method, the aqueous first colored paint (AC1) can be a first aqueous base coat paint composition (BC1), and the aqueous second colored paint (AC2) can be a second base coat paint composition (BC2).

With this configuration, while an antioxidant is more easily and uniformly dissolved or dispersed in the first aqueous base coat paint (BC1) as an undercoat paint composition (X), a clear coat coating film can be formed using the clear coat paint composition (CC) as a topcoat paint composition (Y), whereby color change over time of the resulting multilayer coating film that is left outdoors can be suppressed.

In another specific embodiment of the multilayer coating film formation method, the aqueous first colored paint (AC1) can be an intermediate paint, and the aqueous second colored paint (AC2) can be a first aqueous base coat paint composition (BC1).

Either one of the aqueous first colored paint (AC1) and the aqueous second colored paint (AC2), or both, can contain the antioxidant (a1).

Even with this configuration, while an antioxidant is more easily and uniformly dissolved or dispersed in at least one of the first colored paint (AC1) and the second colored paint (AC2), which are undercoat paint compositions (X), a clear coat coating film can be formed using the clear coat paint composition (CC) as a topcoat paint composition (Y), whereby color change over time of the resulting multilayer coating film that is left outdoors can be suppressed.

In the present invention, an intermediate coating film comprising a white pigment, such as titanium oxide, is formed on a substrate and then cured. Subsequently, an aqueous base coat paint composition comprising an effect pigment and/or a white pigment is applied to the cured intermediate coating film. A clear coat paint composition is further applied to a dry film thickness of 60 μm. Subsequently, the base coat paint composition and the clear coat paint composition are simultaneously heated at 160° C. to cure the resulting films, thus preparing a white test plate. When the conditions are set as described above and a change in b* value in the L*a*b* color system ((HS Z 8729 (2004)) of the test plate over time is calculated by subtracting b* value ($b_1$) of the test plate measured using a multi-angle spectrophotometer immediately after preparing the test plate from b* value ($b_2$) of the test plate measured using the same multi angle spectrophotometer after being left in a place exposed to sunlight for 5 days, the absolute value of the change in b* value over time, $b_2-b_1$ (Ab), is preferably 0.5 or less, and more preferably less than 0.4.

The b* value ($b_1$, $b_2$) is for, among lights reflected when the surface of a test substrate to be measured is irradiated with light at an angle of 45° with respect to the axis perpendicular to the target surface, light reflected in a direction perpendicular to the target surface and measured using a multi-angle colorimeter "BYK-mac" (tradename, produced by BYK-Gardner). Since the color of the substrate is concealed by the multilayer coating film, the b* value of the test plate can also be considered to be the b* value of the multilayer coating film. With this configuration, a multilayer coating film that is less susceptible to fading of yellowish color over time, i.e., a multilayer coating film in which yellowish color loss is less likely to occur, can be produced.

In the present invention, after an aqueous first colored paint as an intermediate paint composition comprising a white pigment, such as titanium oxide, is applied to a substrate, an aqueous second colored paint as an aqueous base coat paint composition comprising an effect pigment and/or a white pigment, and a clear coat paint composition are sequentially applied to the thus coated substrate in such a manner that the clear coat paint composition forms a coating film with a dry film thickness of 60 μm. Subsequently, the aqueous first colored paint as the intermediate paint composition, the aqueous second colored paint as an aqueous base coat paint composition, and the clear coat paint composition are simultaneously heated at 160° C. to cure the paint compositions, thus preparing a white test plate. When the conditions are set as described above and a change in b* value in the L*a*b* color system (JIS Z 8729 (2004)) of the test plate over time is calculated by subtracting b* value ($b_1$) of the test plate measured using a multi-angle colorimeter immediately after preparing the test plate from b* value ($b_2$) of the test plate measured using the same multi-angle colorimeter after the test plate is left in a place exposed to sunlight for 5 days, the absolute value of the change in b* value over time, $b_2-b_1$ (Δb), is preferably 2.0 or less, and more preferably less than 1.8. With this configuration, a multilayer coating film that is less susceptible to fading of yellowish color over time, i.e., a multilayer coating film in which yellowish color loss is less likely to occur, can be produced, The present invention can also take the following configurations.

[1] A multilayer coating film formation method for forming a multilayer coating film on a substrate, the method comprising the steps of:

applying an undercoat paint composition (X) comprising an antioxidant (a1) to a substrate to form at least one layer of an uncured first coating film;

applying a topcoat paint composition (Y) comprising a carboxy-containing polymer (b1) and an epoxy-containing acrylic resin (b2) to the first coating film to form an uncured second coating film; and simultaneously heating the uncured first coating film and the second coating film to cure the films.

With this configuration, a multilayer coating film that has excellent acid resistance, smoothness, gloss, and waterproof adhesion; and whose color change over time after being left outdoors is significantly suppressed can be formed.

[2] The multilayer coating film formation method according to [1], wherein the amount of the antioxidant (a1) is 0.1 to 10 parts by mass, per 100 parts by mass of the solids content of the undercoat paint composition (X), With this configuration, a reduction in curability of the multilayer coating film can be prevented, while color change over time of the multilayer coating film that is left outdoors can be effectively suppressed.

[3] The multilayer coating film formation method according to [1] or [2], wherein the carboxy-containing polymer (b1) comprises a vinyl polymer having a half-esterified acid anhydride group (b1-1) and a carboxy-containing polyester polymer (b1-2).

With this configuration, a multilayer coating film that has excellent acid resistance, smoothness, gloss, and waterproof adhesion can be obtained.

[4] The multilayer coating film formation method according to [3], wherein the vinyl polymer having a half-esterified acid anhydride group (b1-1) has a number average molecular weight in the range of 1000 to 10000.

With this configuration, excellent compatibility with the epoxy-containing acrylic resin, as well as excellent acid resistance and gloss of the multilayer coating film, can be obtained.

[5] The multilayer coating film formation method according to [3] or [4], wherein the carboxy-containing polyester polymer (b1-2) has a number average molecular weight in the range of 500 to 10000.

With this configuration, a multilayer coating film that has excellent acid resistance and gloss can be obtained. [6] The multilayer coating film formation method according to any one of [1] to [5], wherein the proportion of the total amount of the carboxy-containing polymer (b1) and the epoxy-containing acrylic resin (b2) in the topcoat paint composition (Y) is 70% by mass or more.

With this configuration, the topcoat paint composition (Y) has excellent acid resistance.

[7] The multilayer coating film formation method according to any one of [1] to [6], wherein the proportions of the carboxy-containing polymer (b1) and the epoxy-containing acrylic resin (b2), on a solids basis, are such that the proportion of the component (b1) is 20 to 80 mass %, and the proportion of the component (b2) is 80 to 20 mass %, based on the total amount of the component (b1) and component (b2).

With this configuration, the second coating film formed of the topcoat paint composition (Y) has excellent acid resistance and waterproof adhesion.

[8] The multilayer coating film formation method according to any one of [1] to [7], wherein the antioxidant (a1) is at least one member selected from the group consisting of phenolic antioxidants, phosphite antioxidants, and thioether antioxidants.

With this configuration, color change over time of the multilayer coating film that is left outdoors can be effectively suppressed.

[9] The multilayer coating film formation method according to any one of [1] to [8], wherein the first coating film formed of the undercoat paint composition (X) has a dry film thickness of 5 to 40 μm.

With this configuration, the substrate of the first coating film can be sufficiently concealed, and is advantageous in terms of coating operation.

[10] The multilayer coating film formation method according to any one of [1] to [9], wherein the second coating film formed of the topcoat paint composition (Y) has a dry film thickness of 10 to 80 μm.

With this configuration, the second coating film has sufficient weather resistance, and is advantageous in terms of coating operation.

[11] The multilayer coating film formation method according to any one of [1] to [10], wherein the following steps (1) to (3) are performed in sequence:
step (1): applying an aqueous base coat paint composition (BC) to a substrate to form an uncured base coating film;
step (2): applying a clear coat paint composition (CC) to the uncured base coating film formed in step (1) to form an uncured clear coat coating film; and
step (3): simultaneously heating the uncured base coating film formed in step (1) and the uncured clear coat coating film formed in step (2) to cure the films,
wherein the aqueous base coat paint composition (BC) is the undercoat paint composition (X), and the clear coat paint composition (CC) is the topcoat paint composition (Y).

With this configuration, while an antioxidant is more easily and uniformly dissolved or dispersed in the base coat paint composition (BC) as an undercoat paint composition (X), a clear coat coating film can be formed using the clear coat paint composition (CC) as a topcoat paint composition (Y), whereby color change over time of the resulting multilayer coating film that is left outdoors can be suppressed.

[12] The multilayer coating film formation method according to [11], wherein the aqueous base coat paint composition (BC) contains an amine compound (a3).

With this configuration, a multilayer coating film that has excellent acid resistance, smoothness, gloss, and waterproof adhesion; and whose color change over time after being left outdoors is significantly suppressed can be formed.

[13] The multilayer coating film formation method according to any one of [1] to [12], wherein the following steps (1) to (4) are performed in sequence:
step (1): applying an aqueous first colored paint (AC1) to a substrate to form an uncured first colored coating film;
step (2): applying an aqueous second colored paint (AC2) to the uncured first colored coating film formed in step (1) to form an uncured second colored coating film; and
step (3): applying a clear coat paint composition (CC) to the uncured second colored coating film formed in step (2) to form an uncured clear coat coating film; and
step (4): simultaneously heating the uncured first colored coating film, the uncured second colored coating film, and the uncured clear coat coating film formed in steps (1) to (3) to cure the films,
wherein at least one of the aqueous first colored paint (AC1) and the aqueous second colored paint (AC2) is the undercoat paint composition (X), and the clear coat paint composition (CC) is the topcoat paint composition (Y).

With this configuration, while an antioxidant is more easily and uniformly dissolved or dispersed in at least one of the aqueous first colored paint (AC1) and the aqueous second colored paint (AC2) as undercoat paint compositions (X), a clear coat coating film can be formed using the clear coat paint composition (CC) as a topcoat paint composition (Y), whereby color change over time of the multilayer coating film comprising the clear coat coating film and left outdoors can be suppressed.

[14] The multilayer coating film formation method according to [13], wherein at least one of the aqueous first colored paint (AC1) and the aqueous second colored paint (AC2) comprises an amine compound (a3).

With this configuration, a multilayer coating film that has excellent acid resistance, smoothness, gloss, and waterproof adhesion; and whose color change over time after being left outdoors is significantly suppressed can be formed.

[15] The multilayer coating film formation method according to [12] or [14], wherein the amine compound (a3) is a tertiary amine.

With this configuration, the multilayer coating film has improved distinctness of image.

[16] The multilayer coating film formation method according to any one of [1] to [15], wherein the topcoat paint composition (Y) further comprises an antioxidant having a phenyl group and a sulfide bond.

With this configuration, a topcoat paint composition that has excellent acid resistance, smoothness, gloss, waterproof adhesion, and whose color change over time after being left outdoors is significantly suppressed can be obtained.

[17] A multilayer coating film comprising:
an intermediate coating film formed of an intermediate coating paint composition that comprises a white pigment and is applied to a substrate and cured;
an aqueous base coat coating film formed of an aqueous base coat coating composition (BC) that comprises an antioxidant (a1) and an effect pigment and/or a white pigment and is applied to the intermediate paint composition; and a clear coat coating film formed of a clear coat paint composition (CC) that comprises a carboxy-containing polymer (b1) and an epoxy-containing acrylic resin (b2) and is applied to the aqueous base coat coating film;

the multilayer coating film being formed by simultaneously heating the aqueous base coat coating film and the clear coat coating film to cure the films, wherein when a test plate is prepared by applying the clear coat paint composition to a film thickness of 60 μm (when dried) and simultaneously heating the base coat paint coating film and the clear coat coating film at 160° C. to cure the films, and a change in b* value in the L*a*b* color system (JIS Z 8729 (2004)) of the test plate over time is calculated by subtracting b* value ($b_1$) of the test plate measured using a multi-angle colorimeter immediately after preparing the test plate from b* value ($b_2$) of the test plate measured using the same multi-angle colorimeter after being left in a place exposed to sunlight for 5 days, the absolute value of the change in b* value over time, $b_2-b_1$ (Δb), is 0.5 or less.

With this configuration, a multilayer coating film that is less susceptible to fading of yellowish color over time, i.e., a multilayer coating film in which yellowish color loss is less likely to occur, can be produced.

[18] A multilayer coating film comprising:

an aqueous first colored coating film formed of an aqueous first colored paint applied to a substrate;

an aqueous second colored coating film formed of an aqueous second colored paint applied to the aqueous first colored coating film; and a clear coat paint coating film formed of a clear coat paint composition applied to the second colored coating film;

the multilayer coating film being formed by simultaneously heating the first aqueous colored coating film, the second aqueous colored coating film, and the clear coat coating film to cure the films, at least one of the aqueous first colored paint (AC1) and the aqueous second colored paint (AC2) comprising an antioxidant (a1), the clear coat paint composition (CC) comprising a carboxy-containing polymer (b1) and an epoxy-containing acrylic resin (b2), wherein when a test plate is prepared by applying the clear coat paint composition to a film thickness of 60 μm (when dried) and simultaneously heating the base coat paint coating film and the clear coat coating film at 160° C. to cure the films, and a change in b* value in the L*a*b* color system (JIS Z 8729 (2004)) of the test plate over time is calculated by subtracting b* value ($b_1$) of the test plate measured using a multi-angle spectrophotometer immediately after preparing the test plate from b* value ($b_2$) of the test plate measured using the same multi-angle spectrophotometer after being left in a place exposed to sunlight for 5 days, the absolute value of the change in b* value over time, $b_2-b_1$ (Δb), is 2.0 or less.

With this configuration, a multilayer coating film that is less susceptible to fading of yellowish color over time, i.e., a multilayer coating film in which yellowish color loss is less likely to occur, can be produced.

The present invention is described below in more detail with reference to Production Examples, Examples and Comparative Examples. The Production Examples, Examples, and Comparative Examples merely illustrate certain particular embodiments, and are not intended to limit the scope of the claims. The "parts" and "%" are based on mass unless otherwise specified. The coating film thickness is the thickness of a cured coating film.

EXAMPLES

1. Production of Carboxy-Containing Polymer (b1)

Production Example 1: Production of Vinyl Polymer Having Half-Esterified Acid Anhydride Group (b1-1)

680 parts of "Swasol 1000" (trade name, produced by Cosmo Oil Co., Ltd.; a hydrocarbon organic solvent) was placed in a four-necked flask equipped with a stirrer, a thermometer, a cooling tube, and a nitrogen gas inlet, and heated to 125° C. in a nitrogen gas flow. After the temperature reached 125° C., the flow of nitrogen gas was stopped, and the following monomer mixture having a formulation comprising a monomer, a solvent, and a polymerization initiator (p-tert-butylperoxy-2-ethylhexanoate) was added dropwise over a period of 4 hours.

Monomer Mixture I
Styrene: 500 parts
Cyclohexyl methacrylate: 500 parts
Isobutyl methacrylate: 500 parts
Maleic anhydride: 500 parts
2-Ethoxyethyl propionate: 1000 parts
p-Tert-butylperoxy-2-ethylhexanoate: 100 parts After the resulting mixture was aged for 30 minutes while flowing nitrogen gas at 125° C., a mixture of 10 parts of p-tert-butylperoxy-2-ethylhexanoate and 80 parts of "Swasol 1000" was further added dropwise over a period of 1 hour. After cooling to 60° C., 490 parts of methanol and 4 parts of triethylamine were added, and a half-esterification reaction was carried out by heating under reflux for 4 hours. Then, 326 parts of the excess methanol was removed under reduced pressure, thereby obtaining a solution of a vinyl polymer having a half-esterified acid anhydride group (b1-1).

The obtained polymer solution had a solids content of 55 mass % and a number average molecular weight of about 3,500. Moreover, the acid value of this polymer was 130 mgKOH/g.

Production Example 2: Production of Carboxy-Containing Polyester Polymer (b1-2)

566 parts of 1,6-hexanediol, 437 parts of trimethylolpropane, 467 parts of adipic acid, and 308 parts of hexahydrophthalic anhydride were placed in a four-necked flask equipped with a stirrer, a thermometer, a cooling tube, and a nitrogen gas inlet, and heated to 180° C. in a nitrogen atmosphere. Thereafter, the mixture was heated to 230° C. over 3 hours, and reacted at 230° C. for 1 hour. Then, xylene was added, and the resulting mixture was reacted under reflux. After it was confirmed that the resin acid value reached 3 mgKOH/g or less, the resultant was cooled to 100° C., and 1,294 parts of hexahydrophthalic anhydride was added. The resulting mixture was heated to 140° C. again and reacted for 2 hours. After cooling, the resultant was diluted with xylene, thereby obtaining a solution of a carboxy-containing polyester polymer (b1-2) having a solids content of 65 mass %. This polyester had a number average molecular weight of 1040 and a resin acid value of 160 mgKOH/g.

2. Production of Epoxy-Containing Acrylic Resin (b2)

Production Example 3: Production of Epoxy-Containing Acrylic Resin (b2)

410 parts of xylene and 77 parts of n-butanol were placed in a four-necked flask equipped with a stirrer, a thermometer, a cooling tube, and a nitrogen gas inlet, and heated to 125° C. in a nitrogen gas flow. After the temperature reached 125° C., the flow of nitrogen gas was stopped, and the following monomer mixture III was added dropwise over a period of 4 hours.
Monomer mixture III
Styrene: 288 parts
n-Butyl acrylate: 720 parts
Glycidyl methacrylate: 432 parts
2,2-Azobisisobutyronitrile: 72 parts After the resulting mixture was aged for 30 minutes while flowing nitrogen gas at 125° C., a mixture of 90 parts of xylene, 40 parts of n-butanol, and 14.4 parts of 2,2-azobisisobutyronitrile was further added dropwise over a period of 2 hours. The resulting mixture was then aged for 2 hours, thereby obtaining a solution of an epoxy-containing acrylic resin (b2) having a solids content of 70 mass %. The epoxy-containing acrylic resin (b2) had a number average molecular weight of 2000 and an epoxy content of 2.12 mmol/g.

3. Production of Clear Coat Paint Composition (CC)

Production Examples 4 to 6

The vinyl polymer having a half-esterified acid anhydride group (b1-1) obtained in Production Example 1, the carboxy-containing polyester polymer (b1-2) obtained in Production Example 2, the epoxy-containing acrylic resin (b2) obtained in Production Example 3, an antioxidant (c1), and other components, such as a curing catalyst, were stirred and mixed using a rotary blade stirrer. Further, "Swasol 1000" (trade name, produced by Cosmo Oil Co., Ltd.; a hydrocarbon solvent) was added to adjust the viscosity by Ford cup No, 4 at 20° C. to 30 seconds, thereby obtaining clear coat paint compositions (CC-1 to CC-3) of Production Examples 4 to 6.

Table 1 shows the components of each paint composition, and the equivalent ratio of carboxy groups/epoxy groups.

The mixing amount of each component shown in Table 1 represents solids content (part by mass). Further, (Note 1) to (Note 6) in Table 1 mean the following.
(Note 1) "IRGANOX 1520L,": trade name, produced by BASF A.G.; an antioxidant having a phenyl group and a sulfide bond, 2,4-bis(octylthiomethyl)-6-methylphenol.
(Note 2) "IRGANOX 1726": trade name, produced by BASF A.G.; an antioxidant having a phenyl group and a sulfide bond, 2,4-bis(dodecylthiomethyl)-6-methylphenol.
(Note 3) Curing catalyst: an equivalent mixture of tetrabutylammonium bromide and monobutyl phosphoric acid.
(Note 4) "UV1164": trade name, produced by Cytec; an ultraviolet absorber, 2,4-bis(2,4-dimethylphenyl)-6-(2-hydroxy-4-isooctyloxyphenyl)-1,3,5-triazine.
(Note 5) "HALS292": trade name, produced by BASF A.G.; a light stabilizer, a mixture of bis(1,2,2,6,6-pentamethyl-4-piperidyl)sebacate and methyl(1,2,2,6,6-pentamethyl-4-piperidyl)sebacate,
(Note 6) "BYK-300": trade name, produced by BYK-Chemie; a surface adjusting agent, polyether-modified polydimethylsiloxane).

4. Production of Aqueous Base Coat Paint Composition (BC)

Production Example 7: Production of Hydroxy-Containing Acrylic Resin (1)

128 parts of deionized water and 3 parts of "Adeka Reasoap SR-1025" (trade name, produced by Adeka; an emulsifier, active ingredient 25%) were placed in a reaction vessel equipped with a thermometer, a thermostat, a stirrer, a reflux condenser, a nitrogen gas inlet tube, and a dropping funnel. The mixture was stirred and mixed in a nitrogen flow, and heated to 80° C.

Subsequently, 1% of the entire amount of monomer emulsion for a core portion, which is described below, and 5.3 parts of a 6% ammonium persulfate aqueous solution were introduced into the reaction vessel, and maintained therein at 80° C. for 15 minutes, Thereafter, the remaining monomer emulsion for the core portion was added dropwise over a period of 3 hours to the reaction vessel maintained at the same temperature, After completion of the dropwise addition, the mixture was aged for 1 hour. Subsequently, a monomer emulsion for a shell portion, which is described below, was added dropwise over a period of 1 hour, followed by aging for 1 hour. Thereafter, the mixture was cooled to 30° C. while gradually adding 40 parts of a 5% 2-(dimethylamino)ethanol aqueous solution thereto, and then filtered

TABLE 1

|  |  | Production Example | | |
|---|---|---|---|---|
|  |  | 4 | 5 | 6 |
| Name of clear coat paint composition | | CC-1 | CC-2 | CC-3 |
| Carboxy-containing polymer (b) | Vinyl polymer having half-esterified acid anhydride group (b1-1) | 38 | 38 | 38 |
|  | Carboxy-containing polyester polymer (b1-2) | 10 | 10 | 10 |
| Epoxy-containing acrylic resin (b2) | | 52 | 52 | 52 |
| Antioxidant having phenyl group and sulfide bond (c1) | "IRGANOX 1520L" (Note 1) | 1 | | |
|  | "IRGANOX 1726" (Note 2) | | 1 | |
| Curing catalyst | (Note 3) | 2 | 2 | 2 |
| Ultraviolet absorber | "UV1164" (Note 4) | 2 | 2 | 2 |
| Light stabilizer | "HALS292" (Note 5) | 2 | 2 | 2 |
| Surface adjusting agent | "BYK-300" (Note 6) | 0.2 | 0.2 | 0.2 |
| Equivalent ratio of carboxy groups/epoxy groups | | 1.06 | 1.06 | 1.06 | through a 100-mesh nylon cloth, thereby obtaining a water-dispersible hydroxy-containing acrylic resin (a2-1) having an average particle size of 95 nm and a solids content of 30%. The obtained water-dispersible hydroxy-containing acrylic resin had an acid value of 33 mgKOH/g and a hydroxy value of 25 mgKOH/g.

Monomer emulsion for the core portion: 40 parts of deionized water, 2.8 parts of "Adeka Reasoap SR-1025," 2.1 parts of methylene bisacrylamide, 2.8 parts of styrene, 16.1 parts of methyl methacrylate, 28 parts of ethyl acrylate, and 21 parts of n-butyl acrylate were mixed and stirred, thereby obtaining a monomer emulsion for the core portion, Monomer emulsion for the shell portion: 17 parts of deionized water, 1.2 parts of "Adeka Reasoap SR-1025," 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, thereby obtaining a monomer emulsion for the shell portion.

Production Example 8: Production of Hydroxy-Containing Acrylic Resin (2)

35 parts of propylene glycol monopropyl ether was placed in a reaction vessel equipped with a thermometer, a thermostat, a stirrer, a reflux condenser, a nitrogen gas inlet tube, and a dropping funnel, and heated to 85° C., Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour, 7.4 parts of diethanolamine and 13 parts of propylene glycol monopropyl ether were further added thereto, thereby obtaining a hydroxy-containing acrylic resin solution (a2-2) having a solids content of 55%. The obtained hydroxy-containing acrylic resin had an acid value of 47 mgKOH/g and a hydroxy value of 72 mgKOH/g.

Production Example 9: Production of Hydroxy-Containing Polyester Resin 109 parts of trimethylolpropane, 141 parts of 1,6-hexanediol, 126 parts of 1,2-cyclohexanedicarboxylic anhydride, and 120 parts of adipic acid were placed in a reaction vessel equipped with a thermometer, a thermostat, a stirrer, a reflux condenser, a nitrogen gas inlet tube, and a water separator. The mixture was heated to a range of 160° C. to 230° C. over a period of 3 hours, followed by a condensation reaction at 230° C. for 4 hours. Subsequently, to introduce a carboxy group to the obtained condensation reaction product, 38.3 parts of trimellitic anhydride was added to the product, followed by a reaction at 170° C. for 30 minutes. Thereafter, the product was diluted with 2-ethyl-1-hexanol, thereby obtaining a hydroxy-containing polyester resin solution (a2-3) having a solids content of 70%. The obtained hydroxy-containing polyester resin had an acid value of 46 mgKOH/g, a hydroxy value of 150 mgKOH/g, and a number average molecular weight of 1,400.

Production Example 10: Production of Effect Pigment Dispersion

In a stirring vessel, 11 parts of "Iriodin 103" (trade name, produced by Merck japan; a mica-based effect pigment), 34.8 parts of 2-ethyl-1-hexanol, 8 parts (solids content: 4 parts) of the following phosphate group-containing resin solution, and 0.2 parts of 2-(dimethylamino)ethanol were uniformly mixed, thereby obtaining an effect pigment dispersion (P-1).

Phosphate group-containing resin solution: A mixed solvent of 27.5 parts of methoxypropanol and 27.5 parts of isobutanol was placed in a reaction vessel equipped with a thermometer, a thermostat, a stirrer, a reflux condenser, a nitrogen gas inlet tube, and a dropping funnel, and heated to 110° C. 121.5 parts of a mixture comprising 25 parts of styrene, 27.5 parts of n-butyl methacrylate, 20 parts of "Isostearyl Acrylate" (trade name, produced by Osaka Organic Chemical Industry Ltd.; branched higher alkyl acrylate), 7.5 parts of 4-hydroxybutyl acrylate, 15 parts of the following phosphate group-containing polymerizable monomer, 12.5 parts of 2-methacryloyloxyethyl acid Phosphate, 10 parts of isobutanol, and 4 parts of t-butylperoxy octanoate was added to the above mixed solvent over 4 hours. Further, a mixture comprising 0.5 parts of t-butylperoxy octanoate and 20 parts of isopropanol was added dropwise for 1 hour. Then, the resultant was stirred and aged for 1 hour, thereby obtaining a phosphate group-containing resin solution having a solids concentration of 50%. The acid value based on the phosphate group of this resin was 83 mgKOH/g, the hydroxy value was 29 mgKOH/g, and the weight average molecular weight was 10000.

Phosphate group-containing polymerizable monomer; 57.5 parts of monobutyl phosphoric acid and 41 parts of isobutanol were placed in a reaction vessel equipped with a thermometer, a thermostat, a stirrer, a reflux condenser, a nitrogen gas inlet tube, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group-containing polymerizable monomer solution having a solids concentration of 50%, The acid value of the obtained monomer was 285 mgKOH/g.

Production Example 11: Production of Aqueous Base Coat Paint Composition (1)

In a stirring vessel, 100 parts (solids content: 30 parts) of the water-dispersible hydroxy-containing acrylic resin water dispersion (a2-1) obtained in Production Example 7, 18 parts (solids content: 10 parts) of the hydroxy-containing acrylic resin solution (a2-2) obtained in Production Example 8, 43 parts (solids content: 30 parts) of the hydroxy-containing polyester resin solution (a2-3) obtained in Production Example 9, 54 parts of the effect pigment dispersion (P-1) obtained in Production Example 10, 37.5 parts (solids content: 30 parts) of "Cymel 325" (trade name, produced by Allnex; a melamine resin, solids content: 80%), and 1 part of "IRGANOX 1520L" (trade name, produced by BASF A.G.; an antioxidant having a phenyl group and a sulfide bond, 2,4-bis(octylthiomethyl)-6-methylphenol) were uniformly mixed. Further, "Primal ASE-60" (trade name, produced by The Dow Chemical Company; a polyacrylic acid-based thickener), 2-(dimethylamino)ethanol, and deionized water were added, thereby obtaining an aqueous base coat paint (BC-1) having a pH of 8.0, a paint solids content of 25%, and a viscosity by Ford cup No. 4 at 20° C. of 40 seconds.

Production Example 12: Production of Aqueous Base Coat Paint Composition (2)

2-Amino-2-methyl-1-propanol was added in place of the 2-(dimethylamino)ethanol in Production Example 11, and an aqueous base coat paint composition (BC-2) was obtained, Production Example 13: Production of Aqueous Base Coat Paint Composition (3)

In a stirring vessel, 100 parts (solids content: 30 parts) of the water-dispersible hydroxy-containing acrylic resin water dispersion (a2-1) obtained in Production Example 7, 18 parts (solids content: 10 parts) of the hydroxy-containing acrylic resin solution (a2-2) obtained in Production Example 8, 43 parts (solids content: 30 parts) of the hydroxy-containing polyester resin solution (a2-3) obtained in Production Example 9, 54 parts of the effect pigment dispersion (P-1) obtained in Production Example 10, and 37.5 parts (solids content: 30 parts) of "Cymel 325" (trade name, produced by Allnex; a melamine resin, solids content: 80%) were uniformly mixed. Further, "Primal ASE-60" (trade name, produced by The Dow Chemical Company; a polyacrylic acid-based thickener), 2-(dimethylamino)ethanol, and deionized water were added, thereby obtaining an aqueous base coat paint (BC-3) having a pH of 8.0, a paint solids content of 25%, and a viscosity by Ford cup No. 4 at 20° C. of 40 seconds.

5. Production of Aqueous First Colored Paint (AC1)

Production Example 14: Production of Hydroxy-Containing Polyester Resin 174 parts of trimethylolpropane, 327 parts of neopentyl glycol, 352 parts of adipic acid, 109 parts of isophthalic acid, and 101 parts of 1,2-cyclohexanedicarboxylic anhydride were placed in a reaction vessel equipped with a thermometer, a thermostat, a stirrer, a reflux condenser, and a water separator. The mixture was heated to a range of 160 to 230° C. over a period of 3 hours, and maintained at 230° C. while distilling off the generated condensed water with the water separator. The reaction was continued until the acid value reached 3 mgKOH/g or less. 59 parts of trimellitic anhydride was added to the reaction product, and an addition reaction was performed at 170° C. for 30 minutes After cooling to 50° C. or less, 2-(dimethylamino)ethanol was added in an equivalent amount with respect to acid groups to perform neutralization, and deionized water was gradually added, thereby obtaining a hydroxy-containing polyester resin solution (a2-4) having a solids concentration of 45% and a pH of 7.2. The obtained hydroxy-containing polyester resin had an acid value of 35 mgKOH/g, a hydroxy value of 128 mgKOH/g, and a weight average molecular weight of 13000.

Production Example 15: Production of White Pigment Dispersion

In a stirring vessel, 56 parts (resin solids content: 25 parts) of the hydroxy-containing polyester resin solution (a2-4) obtained in Production Example 14, 90 parts of "JR-806" (trade name, produced by Tayca Corporation; rutile titanium dioxide), and 5 parts of deionized water were placed. Further, 2-(dimethylamino)ethanol was added, and the pH was adjusted to 8.0. Subsequently, the obtained mixture was placed in a wide-mouth glass bottle, glass beads having a diameter of about 1.3 mm were added as dispersion media, and the glass bottle was sealed. Then, the mixture was dispersed for 30 minutes using a paint shaker, thereby obtaining a white pigment dispersion (P-2).

Production Example 16: Production of Dispersion of White Pigment and Antioxidant In a stirring vessel, 56 parts (resin solids content: 25 parts) of the hydroxy-containing polyester resin solution (a2-4) obtained in Production Example 14, 90 parts of "JR-806" (trade name, produced by Tayca Corporation; rutile titanium dioxide), 1 part of "Sumilizer GA80" (trade name, produced by Sumitomo Chemical Co., Ltd.; a phenol-based antioxidant, 3,9-bis[2-[3-(3-tert-butyl-4-hydroxy 5 methylphenyl) propionyloxy]-1,1-dimethylethyl]-2,4,8,10-tetraoxaspiro [5.5]undecane), and 5 parts of deionized water were placed. Further, 2-(dimethylamino)ethanol was added, and the pH was adjusted to 8.0. Subsequently, the obtained mixture was placed in a wide-mouth glass bottle, glass beads having a diameter of about 1.3 mm were added as dispersion media, and the glass bottle was sealed. Then, the mixture was dispersed for 30 minutes using a paint shaker, thereby obtaining a dispersion of a white pigment and an antioxidant (P-3), Production Example 17: Production of Aqueous First Colored Paint (1)

151 parts of the pigment dispersion (P-2) obtained in Production Example 15, 27 parts (resin solids content: 15 parts) of the hydroxy-containing acrylic resin solution (a2-2) obtained in Production Example 8, 11 parts (resin solids content: 5 parts) of the hydroxy-containing polyester resin solution (a2-4) obtained in Production Example 14, 43 parts (resin solids content: 15 parts) of "U-COAT UX-8100" (trade name, produced by Sanyo Chemical Industries, Ltd.; a urethane emulsion, solids content: 35%), 37.5 parts (resin solids content: 30 parts) of "Cymel 325" (trade name, produced by Allnex; a melamine resin, solids content: 80%), 26 parts (resin solids content: 10 parts) of "Bayhydur VPLS2310" (trade name, produced by Sumika Bayer Urethane Co., Ltd.; a blocked polyisocyanate compound, solids content: 38%), and 2 parts of "IRGANOX 1520L" (trade name, produced by BASF A.G.; an antioxidant having a phenyl group and a sulfide bond, 2,4-bis(octylthiomethyl)-6-methylphenol) were uniformly mixed.

Subsequently, "Primal ASE-60" (trade name, produced by The Dow Chemical Company; a thickener), 2-(dimethylamino)ethanol, and deionized water were added to the obtained mixture, thereby obtaining an aqueous first colored paint (AC1-1) having a pH of 8.0, a paint solids content of 48%, and a viscosity by Ford cup No. 4 at 20° C. of 30 seconds.

Production Example 18: Production of Aqueous First Colored Paint (2)

152 parts of the pigment dispersion (P-3) obtained in Production Example 16, 27 parts (resin solids content: 15 parts) of the hydroxy-containing acrylic resin solution (a2-2) obtained in Production Example 8, 11 parts (resin solids content: 5 parts) of the hydroxy-containing polyester resin solution (a2-4) obtained in Production Example 14, 43 parts (resin solids content: 15 parts) of "U-COAT UX-8100" (trade name, produced by Sanyo Chemical Industries, Ltd.; a urethane emulsion, solids content: 35%), 37.5 parts (resin solids content: 30 parts) of "Cymel 325" (trade name, produced by Annex; a melamine resin, solids content: 80%), 26 parts (resin solids content: 10 parts) of "Bayhydur VPLS2310" (trade name, produced by Sumika Bayer Urethane Co., Ltd.; a blocked polyisocyanate compound, solids content: 38%), and 1 part of "ADK STAB AO-503" (trade name, produced by Adeka; a thioether-based antioxidant, ditridecyl-3,3'-thiodipropionate) were uniformly mixed.

Subsequently, "Primal. ASE-60" (trade name, produced by The Dow Chemical Company; a thickener), 2-(dimethylamino)ethanol, and deionized water were added to the obtained mixture, thereby obtaining an aqueous first colored paint (AC1-2) having a pH of 8.0, a paint solids content of 48%, and a viscosity by Ford cup No. 4 at 20° C. of 30 seconds.

Production Example 19: Production of Aqueous First Colored Paint (3)

151 parts of the pigment dispersion (P-2) obtained in Production Example 16, 27 parts (resin solids content: 15 parts) of the hydroxy-containing acrylic resin solution (a2-2) obtained in Production Example 8, 11 parts (resin solids content: 5 parts) of the hydroxy-containing polyester resin solution (a2-4) obtained in Production Example 14, 43 parts (resin solids content: 15 parts) of "U-COAT UX-8100" (trade name, produced by Sanyo Chemical Industries, Ltd.; a urethane emulsion, solids content: 35%), 37.5 parts (resin solids content: 30 parts) of "Cymel 325" (trade name, produced by Annex; a melamine resin, solids content: 80%), and 26 parts (resin solids content: 10 parts) of "Bayhydur VPLS2310" (trade name, produced by Sumika Bayer Urethane Co., Ltd.; a blocked polyisocyanate compound, solids content: 38%) were uniformly mixed.

Subsequently, "Primal ASE-60" (trade name, produced by The Dow Chemical Company; a thickener), 2-(dimethylamino)ethanol, and deionized water were added to the obtained mixture, thereby obtaining an aqueous first colored paint (AC1-3) having a pH of 8.0, a paint solids content of 48%, and a viscosity by Ford cup No. 4 at 20° C. of 30 seconds.

6. Production of Aqueous Second Colored Paint (AC2)

Production Example 20: Production of Aqueous Second Colored Paint (1)

In a stirring vessel, 100 parts (solids content: 30 parts) of the water-dispersible hydroxy-containing acrylic resin water dispersion (a2-1) obtained in Production Example 7, 18 parts (solids content: 10 parts) of the hydroxy-containing acrylic resin solution (a2-2) obtained in Production Example 8, 43 parts (solids content: 30 parts) of the hydroxy-containing polyester resin solution (a2-3) obtained in Production Example 9, 54 parts of the effect pigment dispersion (P-1) obtained in Production Example 10, 37.5 parts (solids content: 30 parts) of "Cymel 325" (trade name, produced by Allnex; a melamine resin, solids content: 80%), and 1 part of "IRGANOX 1520L" (trade name, produced by BASF A.G.; an antioxidant having a phenyl group and a sulfide bond, 2,4-bis(octylthiomethyl)-6-methylphenol) were uniformly mixed. Further, "Primal ASE-60" (trade name, produced by The Dow Chemical Company; a polyacrylic acid-based thickener), 2-(dimethylamino)ethanol, and deionized water were added, thereby obtaining an aqueous second colored paint (AC2-1) having a pH of 8.0, a paint solids content of 25%, and a viscosity by Ford cup No. 4 at 20° C. of 40 seconds.

Production Example 21: Production of Aqueous Second Colored Paint (2)

In a stirring vessel, 18 parts (solids content: 10 parts) of the hydroxy-containing acrylic resin solution (a2-2) obtained in Production Example 8, 10 parts of "Sumilizer GA80" (trade name, produced by Sumitomo Chemical Co., Ltd.; a phenol-based antioxidant; 3,9-bis[2-[3-(3-tert-butyl-4-hydroxy-5-methylphenyl)propionyloxy]-1,1-dimethylethyl]-2,4,8,10-tetraoxaspiro[5.5]undecane), and 30 parts of deionized water were placed. Further, 2-(dimethylamino)ethanol was added, and the pH was adjusted to 8.0. Subsequently, the obtained mixture was placed in a wide-mouth glass bottle, glass beads having a diameter of about 1.3 mm were added as dispersion media, and the glass bottle was sealed. Then, the mixture was dispersed for 30 minutes using a paint shaker, thereby obtaining an antioxidant dispersion. Subsequently, in a stirring vessel, 5.8 parts (solids content: 2 parts) of the antioxidant dispersion, 100 parts (solids content: 30 parts) of the water-dispersible hydroxy-containing acrylic resin water dispersion (a2-1) obtained in Production Example 7, 16 parts (solids content: 9 parts) of the hydroxy-containing acrylic resin solution (a2-2) obtained in Production Example 8, 43 parts (solids content: 30 parts) of the hydroxy-containing polyester resin solution (a2-3) obtained in Production Example 9, 54 parts of the effect pigment dispersion (P-1) obtained in Production Example 10, 37.5 parts (solids content: 30 parts) of "Cymel 325" (trade name, produced by Allnex; a melamine resin, solids content: 80%), and 1 part of "ADK STAB AO-503" (trade name, produced by Adeka; a thioether-based antioxidant, ditridecyl-3,3'-thiodipropionate) were uniformly mixed. Further, "Primal ASE-60" (trade name, produced by The Dow Chemical Company; a polyacrylic acid-based thickener), 2-(dimethylamino)ethanol, and deionized water were added, thereby obtaining an aqueous second colored paint (AC2-2) having a pH of 8.0, a paint solids content of 25%, and a viscosity by Ford cup No. 4 at 20° C. of 40 seconds.

Production Example 22: Production of Aqueous Second Colored Paint (3)

In a stirring vessel, 100 parts (solids content: 30 parts) of the water-dispersible hydroxy-containing acrylic resin water dispersion (a2-1) obtained in Production Example 7, 18 parts (solids content: 10 parts) of the hydroxy-containing acrylic resin solution (a2-2) obtained in Production Example 8, 43 parts (solids content: 30 parts) of the hydroxy-containing polyester resin solution (a2-3) obtained in Production Example 9, 54 parts of the effect pigment dispersion (P-1) obtained in Production Example 10, and 37.5 parts (solids content: 30 parts) of "Cymel 325" (trade name, produced by Allnex; a melamine resin, solids content: 80%) were uniformly mixed. Further, "Primal ASE-60" (trade name, produced by The Dow Chemical Company; a polyacrylic acid-based thickener), 2-(dimethylamino)ethanol, and deionized water were added, thereby obtaining an aqueous second colored paint (AC2-3) having a pH of 8.0, a paint solids content of 25%, and a viscosity by Ford cup No. 4 at 20° C. of 40 seconds.

Production Example 23: Production of Aqueous Second Colored Paint (4)

2-Amino-2-methyl-1-propanol was added in place of the 2-(dimethylamino)ethanol in Production Example 22, and an aqueous second colored paint (AC2-4) was obtained.

7. Preparation of Substrate

Production Example 24

A thermosetting epoxy resin cationic electrodeposition paint composition (trade name: "Elecron GT-10," produced by Kansai Paint Co., Ltd.) was applied by electrodeposition to a zinc phosphate-treated cold-rolled steel plate (30 cm×45 cm) to a film thickness of 20 The resulting film was cured by heating at 170° C. for 30 minutes. Thus, a substrate with an electrodeposition coating film formed on a steel plate was produced.

8. Production of Test Plate

Example 1

An intermediate paint composition (trade name: "TP-65-2," produced by Kansai Paint Co., Ltd.; a polyester resin/amino resin organic solvent-based paint composition) was applied to the substrate 1 obtained in Production Example 24 to a film thickness of 35 and the resulting film was cured by heating at 140° C. for 30 minutes. Subsequently, the aqueous base coat paint composition (BC-1) obtained in Production Example 11 was applied to the cured coating surface to a film thickness of 15 μm using a rotary atomization-type bell-shaped coating device, and the resulting film was allowed to stand for 2 minutes, followed by preheating at 80° C. for 3 minutes. Subsequently, the clear coat paint composition (CC-3) obtained in Production Example 6 was applied to the uncured coating surface to a film thickness of 60 The resulting film was allowed to stand for 7 minutes, and then heated at 160° C. for 30 minutes to cure the base coat coating film and the clear coat coating film. Thus, a test plate of Example 1 was produced.

Examples 2 to 4 and Comparative Example 1

Test plates of Examples 2 to 4 and Comparative Example 1 were also produced in the same manner as in Example 1, except that the aqueous base coat paint composition (BC) and the clear coat paint composition (CC) were changed as shown in Table 2.

Example 5

The aqueous first colored paint (AC1-1) obtained in Production Example 17 as an intermediate paint was applied to the substrate 1 obtained in Production Example 24 to a film thickness of 20 μm using a rotary atomization-type bell-shaped coating device, and the resulting film was allowed to stand for 2 minutes, followed by preheating at 80° C. for 3 minutes. Subsequently, the aqueous second colored paint (AC2-3) obtained in Production Example 22 as a base coat paint composition was applied to the uncured aqueous first colored paint (AC1-1) to a film thickness of 15 μm using a rotary atomization-type bell-shaped coating device, and the resulting film was allowed to stand for 2 minutes, followed by preheating at 80° C. for 3 minutes.

Subsequently, the clear coat paint composition (CC-3) obtained in Production Example 6 was applied to the uncured coating surface to a film thickness of 60 μm. The resulting film was allowed to stand for 7 minutes, and then heated at 160° C. for 30 minutes to cure the uncured first colored coating film, the uncured aqueous second colored coating film, and the uncured clear coat coating film. Thus, a test plate of Example 5 was produced.

Examples 6 to 14 and Comparative Example 2

Test plates of Examples 6 to 14 and Comparative Example 2 were also produced in the same manner as in Example 5, except that the aqueous first colored paint (AC1), the aqueous second colored paint (AC2), and the clear coat paint composition (CC) were changed as shown in Table 3.

9. Evaluation of Coating Film

The appearance and performance of the coating film of each test plate obtained in the above manner were evaluated. Table 2 shows the results.

Appearance Evaluation

Color change over time: Immediately after production of the test plates obtained in Examples 1 to 14 and Comparative Examples 1 and 2, the b* values ($b_1$) of the test plates were measured using a multi-angle spectrophotometer (trade name: "BYK-mac," produced by BYK-Gardner). The b* value is for, among lights reflected when the surface to be measured is irradiated with light at an angle of 45° with respect to the axis perpendicular to the target surface, light reflected in a direction perpendicular to the target surface (light having a deflection angle of 45° from specular reflection light) (JIS Z 8729 (2004)). After the test plate was allowed to stand for 5 days in a place exposed to sunlight, the b* value ($b_2$) of the test plate was measured, and the color change over time $b_2-b_1$ (Δb) of the b* values was determined. A smaller absolute value of Δb indicates that the color change over time is more suppressed.

Distinctness of image: The test plates were evaluated using Wa values measured by Wave Scan DOI (trade name, produced by BYK Gardner). A smaller Wa value indicates a higher distinctness of image of the coating surface.

Acid resistance: 0.4 cc of 40% aqueous sulfuric acid solution was added dropwise to the coating film of each coated test plate. The test plate was heated for 15 minutes on a hot plate heated to 60° C., and then washed with water. The etching depth (μm) of the portion at which the sulfuric acid had been dropped was measured using a surface roughness tester (trade name: "Surfcom 570A," produced by Tokyo Seimitsu Co., Ltd.) with a cutoff of 0.8 mm (scanning rate of 0.3 mm/sec, 5,000× magnification) to evaluate the acid resistance. A smaller etching depth indicates better acid resistance.

Smoothness: The test plates were evaluated using Wc values measured by Wave Scan DOI (trade name, produced by BYK Gardner). The Wc value is an index of the amplitude of surface roughness at a wavelength of about 1 to 3 mm. A smaller measured value indicates a higher smoothness of the coating surface.

Gloss: The 20-degree specular reflection (20° gloss value) of each coated test plate was evaluated using values measured with a handy glossmeter (trade name: "HG-268," produced by Suga Test Instruments Co., Ltd.).

TABLE 2

|  |  | Example | | | | Comparative Example |
| --- | --- | --- | --- | --- | --- | --- |
|  |  | 1 | 2 | 3 | 4 | 1 |
| Aqueous base coat paint composition (BC) |  | BC-1 | BC-2 | BC-1 | BC-2 | BC-3 |
| Clear paint composition (CC) |  | CC-3 | CC-3 | CC-1 | CC-1 | CC-3 |
| Evaluation | Color change over time | −0.3 | −0.3 | −0.2 | −0.2 | −0.6 |
|  | Distinctness of image | 7 | 11 | 8 | 11 | 8 |
|  | Acid resistance | 0.3 | 0.3 | 0.3 | 0.3 | 0.3 |
|  | Smoothness | 7 | 10 | 8 | 11 | 9 |
|  | Gloss | 87 | 86 | 86 | 87 | 87 |

TABLE 3

|  |  | Example | | | | | | | | | | Comparative Example |
| --- | --- | --- | --- | --- | --- | --- | --- | --- | --- | --- | --- | --- |
|  |  | 5 | 6 | 7 | 8 | 9 | 10 | 11 | 12 | 13 | 14 | 2 |
| Aqueous first colored paint (AC1) |  | AC1-1 | AC1-1 | AC1-1 | AC1-2 | AC1-2 | AC1-2 | AC1-2 | AC1-2 | AC1-2 | AC1-2 | AC1-3 |
| Aqueous second colored paint (AC2) |  | AC2-3 | AC2-4 | AC2-3 | AC2-3 | AC2-4 | AC2-3 | AC2-3 | AC2-1 | AC2-2 | AC2-1 | AC2-3 |
| Clear paint composition (CC) |  | CC-3 | CC-3 | CC-1 | CC-3 | CC-3 | CC-1 | CC-2 | CC-3 | CC-3 | CC-1 | CC-3 |
| Evaluation | Color change over time | −1.3 | −1.3 | −0.4 | −1.6 | −1.6 | −0.7 | −0.5 | −1.1 | −1.5 | −0.3 | −2.3 |
|  | Distinctness of image | 10 | 13 | 10 | 10 | 12 | 10 | 11 | 10 | 10 | 11 | 10 |
|  | Acid resistance | 0.3 | 0.3 | 0.3 | 0.3 | 0.3 | 0.3 | 0.3 | 0.3 | 0.3 | 0.3 | 0.3 |
|  | Smoothness | 12 | 15 | 11 | 12 | 14 | 12 | 12 | 12 | 11 | 13 | 12 |
|  | Gloss | 86 | 86 | 87 | 86 | 86 | 86 | 86 | 87 | 86 | 87 | 86 |

As shown in Table 2, the test plates of Examples 1 to 4 show excellent results of color change over time, distinctness of image, acid resistance, smoothness, and gloss. It was revealed that the test plates of Examples 1 to 4 showed a smaller change Δb in yellowish color over time than the test plate of Comparative Example 1.

Moreover, as shown in Table 3, the test plates of Examples 5 to 14 show excellent results of color change over time, distinctness of image, acid resistance, smoothness, and gloss. It was revealed that the test plates of Examples 5 to 14 showed a smaller change Δb in yellowish color over time than the test plate of Comparative Example 2.

Further, regarding the measurement of color change over time, Tables 4 and 5 show b* values ($b_1$) and b* values ($b_2$). Unexpectedly, it was revealed that in the multilayer coating films of Examples 1 to 4 and Examples 5 to 14, the initial b* value ($b_1$) immediately after curing of the coating film tended to be equivalent or lower than that of the Comparative Example, whereas the b* value ($b_2$) on day 5 almost did not change from the initial value. It was also revealed that the multilayer coating films of Examples 1 to 4 and Examples 5 to 14 showed a smaller change Δb in yellowish color over time than the multilayer coating films of Comparative Examples 1 and 2; that is, there was less fading of yellowish color over time.

TABLE 4

|  |  | 0 h ($b_1$) | Day 5 ($b_2$) | Δb ($b_2 - b_1$) |
| --- | --- | --- | --- | --- |
| Example | 1 | 4.2 | 3.9 | −0.3 |
|  | 2 | 4.2 | 3.9 | −0.3 |
|  | 3 | 4.0 | 3.8 | −0.2 |
|  | 4 | 4.0 | 3.8 | −0.2 |
| Comparative Example | 1 | 4.1 | 3.5 | −0.6 |

TABLE 5

|  |  | 0 h ($b_1$) | Day 5 ($b_2$) | Δb ($b_2 - b_1$) |
| --- | --- | --- | --- | --- |
| Example | 5 | 4.9 | 3.6 | −1.3 |
|  | 6 | 4.8 | 3.5 | −1.3 |
|  | 7 | 4.3 | 3.9 | −0.4 |
|  | 8 | 5.1 | 3.5 | −1.6 |
|  | 9 | 5.2 | 3.6 | −1.6 |
|  | 10 | 4.6 | 3.9 | −0.7 |
|  | 11 | 4.0 | 3.5 | −0.5 |
|  | 12 | 4.6 | 3.5 | −1.1 |
|  | 13 | 5.0 | 3.5 | −1.5 |
|  | 14 | 4.1 | 3.8 | −0.3 |
| Comparative Example | 2 | 6.2 | 3.9 | −2.3 |

The invention claimed is:

1. A multilayer coating film formation method for forming a multilayer coating film on a substrate, the method comprising the steps of:
 applying an undercoat paint composition (X) comprising an antioxidant (a1) to a substrate to form at least one layer of an uncured first coating film;
 applying a topcoat paint composition (Y) comprising a carboxy-containing polymer (b1) and an epoxy-containing acrylic resin (b2) to the first coating film to form an uncured second coating film, wherein the carboxy-containing polymer (b1) is
(i) a vinyl polymer having a half-esterified acid anhydride group (b1-1),
(ii) a carboxy-containing polyester polymer (b1-2), or
(iii) a combination of the vinyl polymer having a half-esterified acid anhydride group (b1-1) and the carboxy-containing polyester polymer (b1-2); and
simultaneously heating the uncured first coating film and the uncured second coating film to cure the films such that the epoxy-containing acrylic resin (b2) functions as a crosslinking-curing agent only for the carboxy-containing polymer (b1).

2. The multilayer coating film formation method according to claim 1, wherein the amount of the antioxidant (a1) is 0.1 to 10 parts by mass, per 100 parts by mass of the solids content of the undercoat paint composition (X).

3. The multilayer coating film formation method according to claim 1, wherein the following steps (1) to (3) are performed in sequence:
step (1): applying an aqueous base coat paint composition (BC) to a substrate to form an uncured base coat coating film;
step (2): applying a clear coat paint composition (CC) to the uncured base coat coating film formed in step (1) to form an uncured clear coat coating film; and
step (3): simultaneously heating the uncured base coat coating film formed in step (1) and the uncured clear coat coating film formed in step (2) to cure the films,
wherein the base coat paint composition (BC) is the undercoat paint composition (X), and the clear coat paint composition (CC) is the topcoat paint composition (Y).

4. The multilayer coating film formation method according to claim 3, wherein the aqueous base coat paint composition (BC) comprises an amine compound (a3).

5. The multilayer coating film formation method according to claim 1, wherein the following steps (1) to (4) are performed in sequence:
step (1): applying an aqueous first colored paint (AC1) to a substrate to form an uncured first colored coating film;
step (2): applying an aqueous second colored paint (AC2) to the uncured first colored coating film formed in step (1) to form an uncured second colored coating film;
step (3): applying a clear coat paint composition (CC) to the uncured second colored coating film formed in step (2) to form an uncured clear coat coating film; and
step (4): simultaneously heating the uncured first colored coating film, the uncured second colored coating film, and the uncured clear coat coating film formed in steps (1) to (3) to cure the films;
wherein at least one of the aqueous first colored paint (AC1) and the aqueous second colored paint (AC2) is the undercoat paint composition (X), and the clear coat paint composition (CC) is the topcoat paint composition (Y).

6. The multilayer coating film formation method according to claim 5, wherein the aqueous second colored paint (AC2) comprises an amine compound (a3).

7. The multilayer coating film formation method according to claim 4, wherein the amine compound (a3) is a tertiary amine.

8. The multilayer coating film formation method according to claim 1, wherein the topcoat paint composition (Y) further comprises an antioxidant having a phenyl group and a sulfide bond.

9. The multilayer coating film formation method according to claim 2, wherein the following steps (1) to (3) are performed in sequence:
step (1): applying an aqueous base coat paint composition (BC) to a substrate to form an uncured base coat coating film;
step (2): applying a clear coat paint composition (CC) to the uncured base coat coating film formed in step (1) to form an uncured clear coat coating film; and
step (3): simultaneously heating the uncured base coat coating film formed in step (1) and the uncured clear coat coating film formed in step (2) to cure the films,
wherein the base coat paint composition (BC) is the undercoat paint composition (X), and the clear coat paint composition (CC) is the topcoat paint composition (Y).

10. The multilayer coating film formation method according to claim 2, wherein the following steps (1) to (4) are performed in sequence:
step (1): applying an aqueous first colored paint (AC1) to a substrate to form an uncured first colored coating film;
step (2): applying an aqueous second colored paint (AC2) to the uncured first colored coating film formed in step (1) to form an uncured second colored coating film;
step (3): applying a clear coat paint composition (CC) to the uncured second colored coating film formed in step (2) to form an uncured clear coat coating film; and
step (4): simultaneously heating the uncured first colored coating film, the uncured second colored coating film, and the uncured clear coat coating film formed in steps (1) to (3) to cure the films;
wherein at least one of the aqueous first colored paint (AC1) and the aqueous second colored paint (AC2) is the undercoat paint composition (X), and the clear coat paint composition (CC) is the topcoat paint composition (Y).

11. The multilayer coating film formation method according to claim 9, wherein the aqueous base coat paint composition (BC) comprises an amine compound (a3).

12. The multilayer coating film formation method according to claim 10, wherein at least one of the aqueous first colored paint (AC1) and the aqueous second colored paint (AC2) comprises an amine compound (a3).

13. The multilayer coating film formation method according to claim 6, wherein the amine compound (a3) is a tertiary amine.

14. The multilayer coating film formation method according to claim 11, wherein the amine compound (a3) is a tertiary amine.

15. The multilayer coating film formation method according to claim 12, wherein the amine compound (a3) is a tertiary amine.

16. The multilayer coating film formation method according to claim 1, wherein the undercoat paint composition (X) further includes at least one effect pigment selected from the group consisting of aluminum oxide, mica, titanium oxide- or iron oxide-coated aluminum oxide, and titanium oxide- or iron oxide-coated mica.

17. The multilayer coating film formation method according to claim 5, wherein the aqueous second colored paint (AC2) comprises
an amine compound (a3), and
at least one effect pigment selected from the group consisting of aluminum oxide, mica, titanium oxide- or iron oxide-coated aluminum oxide, and titanium oxide- or iron oxide-coated mica.

18. The multilayer coating film formation method according to claim 1, wherein undercoat paint composition (X) includes hydroxy-containing acrylic resin.

19. A multilayer coating film formation method for forming a multilayer coating film on a substrate, the method comprising the steps of:
applying an undercoat paint composition (X) comprising an antioxidant (a1) to a substrate to form at least one layer of an uncured first coating film;
applying a topcoat paint composition (Y) comprising a carboxy-containing polymer (b1) and an epoxy-containing acrylic resin (b2) to the first coating film to form an uncured second coating film, the carboxy-containing polymer (b1) including at least one selected from the group consisting of a vinyl polymer having a half-esterified acid anhydride group (b1-1) and a carboxy-containing polyester polymer (b1-2); and
simultaneously heating the uncured first coating film and the uncured second coating film to cure the films such that the epoxy-containing acrylic resin (b2) functions as a crosslinking-curing agent for the carboxy-containing polymer (b1),
wherein the topcoat paint composition (Y) consists of a carboxy-containing polymer (b1) and an epoxy-containing acrylic resin (b2) to the first coating film to form an uncured second coating film, the carboxy-containing polymer (b1) consisting of at least one selected from the group consisting of a vinyl polymer having a half-esterified acid anhydride group (b1-1) and a carboxy-containing polyester polymer (b1-2).

20. A multilayer coating film formation method for forming a multilayer coating film on a substrate, the method comprising the steps of:
applying an undercoat paint composition (X) comprising an antioxidant (a1) to a substrate to form at least one layer of an uncured first coating film;
applying a topcoat paint composition (Y) comprising a carboxy-containing polymer (b1) and an epoxy-containing acrylic resin (b2) to the first coating film to form an uncured second coating film, the carboxy-containing polymer (b1) including at least one selected from the group consisting of a vinyl polymer having a half-esterified acid anhydride group (b1-1) and a carboxy-containing polyester polymer (b1-2); and
simultaneously heating the uncured first coating film and the uncured second coating film to cure the films such that the epoxy-containing acrylic resin (b2) functions as a crosslinking-curing agent for the carboxy-containing polymer (b1),
wherein the topcoat paint composition (Y) consists of a carboxy-containing polymer (b1), an epoxy-containing acrylic resin (b2), an antioxidant, a curing catalyst, an ultraviolet absorber, a light stabilizer, and a surface adjusting agent.

21. A multilayer coating film formation method for forming a multilayer coating film on a substrate, the method comprising the steps of:
applying an undercoat paint composition (X) comprising an antioxidant (a1) to a substrate to form at least one layer of an uncured first coating film;
applying a topcoat paint composition (Y) comprising a carboxy-containing polymer (b1) and an epoxy-containing acrylic resin (b2) to the first coating film to form an uncured second coating film, the carboxy-containing polymer (b1) including at least one selected from the group consisting of a vinyl polymer having a half-esterified acid anhydride group (b1-1) and a carboxy-containing polyester polymer (b1-2); and
simultaneously heating the uncured first coating film and the uncured second coating film to cure the films such that the epoxy-containing acrylic resin (b2) functions as a crosslinking-curing agent for the carboxy-containing polymer (b1),
wherein the topcoat paint composition (Y) consists of a carboxy-containing polymer (b1), an epoxy-containing acrylic resin (b2), an antioxidant, a curing catalyst, an ultraviolet absorber, a light stabilizer, and a surface adjusting agent, and
wherein the antioxidant includes an antioxidant having phenyl group and sulfide bond.

22. The multilayer coating film formation method according to claim 1, wherein the topcoat paint composition (Y) consists of a carboxy-containing polymer (b1), an epoxy-containing acrylic resin (b2), an antioxidant, a curing catalyst, a pigment, a resin other than the carboxy-containing polymer (b1) and the epoxy-containing acrylic resin (b2), an ultraviolet absorber, a light stabilizer, and an organic solvent,
wherein the resin other than the carboxy-containing polymer (b1) and the epoxy-containing acrylic resin (b2) is at least one selected from the group consisting of acrylic resins, polyester resins, alkyd resins, and fluorine resins.

23. The multilayer coating film formation method according to claim 1, wherein the topcoat paint composition (Y) consists of a carboxy-containing polymer (b1), an epoxy-containing acrylic resin (b2), an antioxidant, a curing catalyst, a pigment, a resin other than the carboxy-containing polymer (b1) and the epoxy-containing acrylic resin (b2), an ultraviolet absorber, a light stabilizer, an organic solvent, a surface modifier, and an anti-foaming agent,
wherein the resin other than the carboxy-containing polymer (b1) and the epoxy-containing acrylic resin (b2) is at least one selected from the group consisting of acrylic resins, polyester resins, alkyd resins, and fluorine resins.

* * * * *